US011307738B2

(12) United States Patent
Shukla et al.

(10) Patent No.: US 11,307,738 B2
(45) Date of Patent: Apr. 19, 2022

(54) METHOD AND SYSTEM FOR NAVIGATING THROUGH AN APPLICATION IN A USER DEVICE

(71) Applicant: Visa International Service Association, San Francisco, CA (US)

(72) Inventors: Vaibhav Shukla, Bangalore (IN); Sindhu Shankar Rao, Bangalore (IN)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 16/595,808

(22) Filed: Oct. 8, 2019

(65) Prior Publication Data

US 2021/0103364 A1    Apr. 8, 2021

(51) Int. Cl.
*G06F 3/0488*   (2013.01)
*G06F 3/0482*   (2013.01)
*G06Q 20/08*    (2012.01)

(52) U.S. Cl.
CPC .......... *G06F 3/0482* (2013.01); *G06F 3/0488* (2013.01); *G06Q 20/085* (2013.01); *G06F 2203/04808* (2013.01)

(58) Field of Classification Search
CPC ............................................. G06F 2203/0381
See application file for complete search history.

(56) References Cited

U.S. PATENT DOCUMENTS

| | | | |
|---|---|---|---|
| 2005/0122313 A1* | 6/2005 | Ashby ................... | G06F 3/0238 345/168 |
| 2012/0133600 A1* | 5/2012 | Marshall ............. | G06F 3/04845 345/173 |
| 2012/0252359 A1 | 10/2012 | Adams et al. | |
| 2014/0040834 A1* | 2/2014 | Thompson .......... | G06F 3/04883 715/856 |
| 2015/0220914 A1* | 8/2015 | Purves ................... | G06Q 20/36 705/26.8 |
| 2015/0269555 A1 | 9/2015 | Clark | |
| 2018/0026364 A1* | 1/2018 | Chou ..................... | H01Q 1/245 343/757 |
| 2020/0133474 A1* | 4/2020 | Helke ................. | G06F 3/03547 |

FOREIGN PATENT DOCUMENTS

WO    2017051959 A1    3/2017

* cited by examiner

*Primary Examiner* — Di Xiao
(74) *Attorney, Agent, or Firm* — The Webb Law Firm

(57) ABSTRACT

Disclosed herein is method and application navigation system for navigating through an application. The method includes detecting at least one of an operating hand of a user holding a user device and a number of touch points on one or more screens of the application. The application includes a plurality of menu options on each of one or more screens. Thereafter, the method includes selecting a menu option, from the plurality of menu options on one or more screens. The selected menu option corresponds to detecting at least one of the operating hand of the user and the number of touch points on one or more screens. Once the menu option is selected, one or more menu options associated with each selected menu option is provided on a screen subsequent to one or more screens thereby navigating through the application.

15 Claims, 20 Drawing Sheets

METHOD AND SYSTEM FOR NAVIGATING THROUGH AN APPLICATION IN A USER DEVICE

BACKGROUND

Technical Field

The present subject matter is generally related to mobile ergonomics and more particularly, but not exclusively, to a method and system for navigating through an application in a user device.

Technical Considerations

Mobile devices/user devices continue to grow in popularity and have become an integral part of both personal and business communications. Also, there is an increase in a number of applications that the users use in the mobile devices for performing various functionalities. Each application comprises various menu options for performing a particular function associated with the selected menu option.

The growing applications are both a boon and a bane to a user of the mobile device. It is a boon as the consumers are now empowered to use whichever option they want. It is a bane as users may find it hard to choose or navigate between multiple options to make a quick selection of the required option.

The information disclosed in this background of the disclosure section is only for enhancement of understanding of the general background of the disclosure and should not be taken as an acknowledgement or any form of suggestion that this information forms the prior art already known to a person skilled in the art.

SUMMARY

Accordingly, provided are improved methods, systems, and user devices for navigating through an application in a user device.

In some non-limiting embodiments or aspects, provided is a computer-implemented method, comprising: detecting, with one or more processors in communication with one or more sensors, at least one of an operating hand of a user holding a user device, configured with an application, and a number of touch points on one or more screens of the application, wherein the application comprises a plurality of menu options on each of the one or more screens; selecting, with one or more processors, a menu option from the plurality of menu options on the one or more screens corresponding to the detected at least one of the operating hand of the user and the number of touch points on the one or more screens, wherein each selected menu option on the one or more screens is associated with one or more menu options in a screen subsequent to the one or more screens; and displaying or causing the display of, with one or more processors, the one or more menu options associated with each selected menu option on the screen subsequent to the one or more screens.

In some non-limiting embodiments or aspects, the method further comprises initiating, with one or more processors, a transaction based on a selection of one or more final menu options among the one or more menu options displayed on a final screen of the one or more screens of the application. In some non-limiting embodiments or aspects, the one or more sensors are embedded in the user device and comprise at least one of the following: a gyroscope, a pressure sensor, a touch sensor, an accelerometer, or any combination thereof. In some non-limiting embodiments or aspects, the number of touch points are detected based on sensor data comprising information about one or more fingers of the operating hand of the user holding the user device. In some non-limiting embodiments or aspects, the at least one of the operating hand of the user holding the user device and the number of touch points on the one or more screens of the application is mapped, with one or more processors, to the one or more menu options of the application based on a predefined user profile of each user holding the user device.

In some non-limiting embodiments or aspects, provided is an application navigation system, comprising: one or more processors in communication with one or more sensors; and one or more computer-readable media communicatively coupled to the one or more processors and storing instructions, which upon execution, causes the one or more processors to: detect at least one of an operating hand of a user holding a user device, configured with an application, and a number of touch points on one or more screens of the application, wherein the application comprises a plurality of menu options on each of the one or more screens; select a menu option from the plurality of menu options on the one or more screens corresponding to the detected at least one of the operating hand of the user and the number of touch points on the one or more screens, wherein each selected menu option on the one or more screens is associated with one or more menu options in a screen subsequent to the one or more screens; and display or cause the display of the one or more menu options associated with each selected menu option on the screen subsequent to the one or more screens.

In some non-limiting embodiments or aspects, the one or more processors initiates a transaction based on selection of one or more final menu options among the one or more menu options on a final screen of the one or more screens of the application. In some non-limiting embodiments or aspects, the one or more sensors are embedded in the user device and comprise at least one of the following: a gyroscope, a pressure sensor, a touch sensor, an accelerometer, or any combination thereof. In some non-limiting embodiments or aspects, the one or more processors detects the number of touch points based on sensor data comprising information about one or more fingers of the operating hand of the user holding the user device. In some non-limiting embodiments or aspects, the one or more processors maps at least one of the operating hand of the user holding the user device and the number of touch points on the one or more screens of the application to the one or more menu options of the application based on a predefined user profile of each user holding the user device.

In some non-limiting embodiments or aspects, provided is a user device, comprising: a display screen; one or more processors in communication with one or more sensors; and one or more computer-readable media communicatively coupled to the one or more processors and storing instructions, which upon execution, causes the one or more processors to: detect at least one of an operating hand of a user holding a user device, configured with an application, and a number of touch points on one or more screens of the application, wherein the application comprises a plurality of menu options on each of the one or more screens; select a menu option from the plurality of menu options on the one or more screens corresponding to the detected at least one of the operating hand of the user and the number of touch points on the one or more screens, wherein each selected menu option on the one or more screens is associated with one or more menu options in a screen subsequent to the one or more screens; and display or cause the display of, on the display screen, the one or more menu options associated with each selected menu option on the screen subsequent to the one or more screens.

In some non-limiting embodiments or aspects, the one or more sensors are embedded in the user device and comprise at least one of the following: a gyroscope, a pressure sensor, a touch sensor, an accelerometer, or any combination thereof. In some non-limiting embodiments or aspects, the one or more processors initiates a transaction based on selection of one or more final menu options among the one or more menu options on a final screen of the one or more screens of the application. In some non-limiting embodiments or aspects, the one or more processors detects the number of touch points based on sensor data comprising information about one or more fingers of the operating hand of the user holding the user device. In some non-limiting embodiments or aspects, the one or more processors maps at least one of the operating hand of the user holding the user device and the number of touch points on the one or more screens of the application to the one or more menu options of the application based on a predefined user profile of each user holding the user device.

Further non-limiting embodiments or aspects are set forth in the following numbered clauses:

Clause 1: A computer-implemented method, comprising: detecting, with one or more processors in communication with one or more sensors, at least one of an operating hand of a user holding a user device, configured with an application, and a number of touch points on one or more screens of the application, wherein the application comprises a plurality of menu options on each of the one or more screens; selecting, with one or more processors, a menu option from the plurality of menu options on the one or more screens corresponding to the detected at least one of the operating hand of the user and the number of touch points on the one or more screens, wherein each selected menu option on the one or more screens is associated with one or more menu options in a screen subsequent to the one or more screens; and displaying or causing the display of, with one or more processors, the one or more menu options associated with each selected menu option on the screen subsequent to the one or more screens.

Clause 2: The method of clause 1, further comprising initiating, with one or more processors, a transaction based on a selection of one or more final menu options among the one or more menu options displayed on a final screen of the one or more screens of the application.

Clause 3: The method of clause 1 or 2, wherein the one or more sensors are embedded in the user device and comprise at least one of the following: a gyroscope, a pressure sensor, a touch sensor, an accelerometer, or any combination thereof.

Clause 4: The method of any of clauses 1-3, wherein the number of touch points are detected based on sensor data comprising information about one or more fingers of the operating hand of the user holding the user device.

Clause 5: The method of any of clauses 1-4, wherein the at least one of operating hand of the user holding the user device and the number of touch points on the one or more screens of the application is mapped, with one or more processors, to the one or more menu options of the application based on a predefined user profile of each user holding the user device.

Clause 6: An application navigation system, comprising: one or more processors in communication with one or more sensors; and one or more computer-readable media communicatively coupled to the one or more processors and storing instructions, which upon execution, causes the one or more processors to: detect at least one of an operating hand of a user holding a user device, configured with an application, and a number of touch points on one or more screens of the application, wherein the application comprises a plurality of menu options on each of the one or more screens; select a menu option from the plurality of menu options on the one or more screens corresponding to the detected at least one of the operating hand of the user and the number of touch points on the one or more screens, wherein each selected menu option on the one or more screens is associated with one or more menu options in a screen subsequent to the one or more screens; and display or cause the display of the one or more menu options associated with each selected menu option on the screen subsequent to the one or more screens.

Clause 7: The application navigation system of clause 6, wherein the one or more processors initiates a transaction based on selection of one or more final menu options among the one or more menu options on a final screen of the one or more screens of the application.

Clause 8: The application navigation system of clause 6 or 7, wherein the one or more sensors are embedded in the user device and comprise at least one of the following: a gyroscope, a pressure sensor, a touch sensor, an accelerometer, or any combination thereof.

Clause 9: The application navigation system of any of clauses 6-8, wherein the one or more processors detects the number of touch points based on sensor data comprising information about one or more fingers of the operating hand of the user holding the user device.

Clause 10: The application navigation system of any of clauses 6-9, wherein the one or more processors maps at least one of the operating hand of the user holding the user device and the number of touch points on the one or more screens of the application to the one or more menu options of the application based on a predefined user profile of each user holding the user device.

Clause 11: A user device, comprising: a display screen; one or more processors in communication with one or more sensors; and one or more computer-readable media communicatively coupled to the one or more processors and storing instructions, which upon execution, causes the one or more processors to: detect at least one of an operating hand of a user holding a user device, configured with an application, and number of touch points on one or more screens of the application, wherein the application comprises plurality of menu options on each of the one or more screens; select a menu option from the plurality of menu options on the one or more screens corresponding to the detected at least one of the operating hand of the user and the number of touch points on the one or more screens, wherein each selected menu option on the one or more screens is associated with one or more menu options in a screen subsequent to the one or more screens; and display or cause the display of, on the display screen, the one or more menu options associated with each selected menu option on the screen subsequent to the one or more screens.

Clause 12: The user device of clause 11, wherein the one or more sensors are embedded in the user device and comprise at least one of the following: a gyroscope, a pressure sensor, a touch sensor, an accelerometer, or any combination thereof.

Clause 13: The user device of clause 11 or 12, wherein the one or more processors initiates a transaction based on selection of one or more final menu options among the one or more menu options on a final screen of the one or more screens of the application.

Clause 14: The user device of any of clauses 11-13, wherein the one or more processors detects the number of touch points based on sensor data comprising information about one or more fingers of the operating hand of the user holding the user device.

Clause 15: The user device of any of clauses 11-14, wherein the one or more processors maps at least one of the operating hand of the user holding the user device and the number of touch points on the one or more screens of the application to the one or more menu options of the application based on a predefined user profile of each user holding the user device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The non-limiting embodiments or aspects of the present disclosure are illustrated by way of example, and not in way by limitation, in the figures of the accompanying drawings and in which like reference numerals refer to similar elements and in which.

Figure 1A:
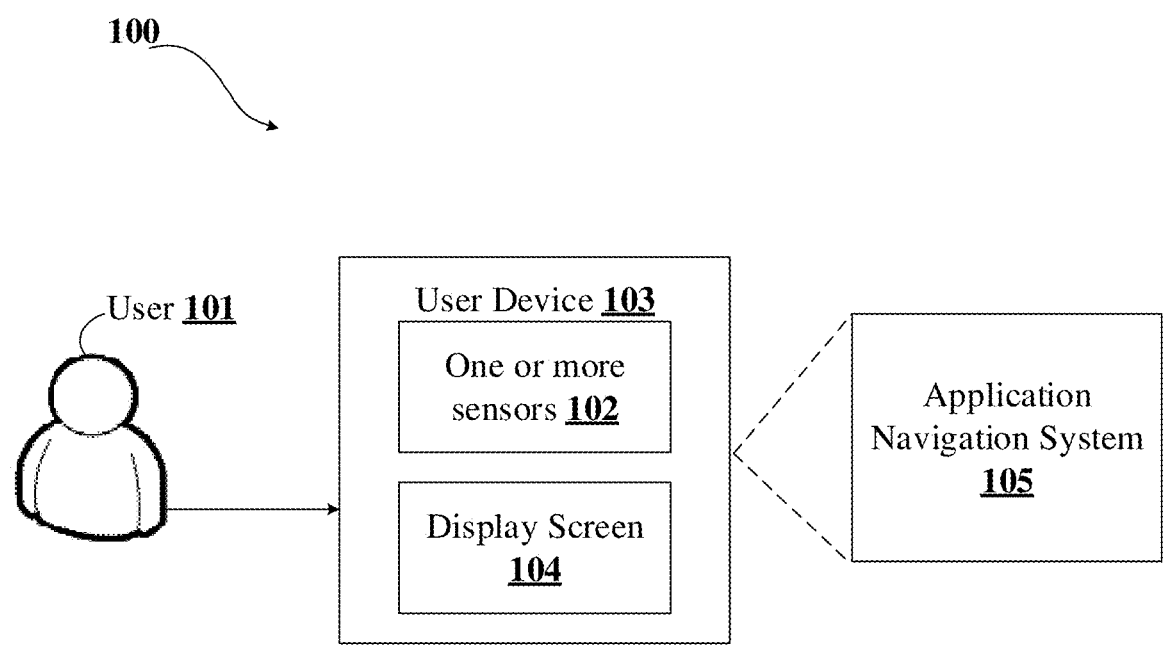
FIG. 1a shows an exemplary architecture for navigating through an application in accordance with some non-limiting embodiments or aspects of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown. While each of the figures illustrates a particular embodiment for purposes of illustrating a clear example, other embodiments may omit, add to, reorder, and/or modify any of the elements shown in the figures.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, a specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternatives falling within the scope of the disclosure.

The terms "comprises," "comprising," "includes," "including," or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least in partially on" unless explicitly stated otherwise. The term "some non-limiting embodiments or aspects" means "one or more (but not all) embodiments or aspects of the disclosure(s)" unless expressly specified otherwise. A description of some non-limiting embodiments or aspects with several components in communication with each other does not imply that all such components are required. On the contrary, a variety of optional components is described to illustrate the wide variety of possible embodiments of the disclosure.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the disclosure need not include the device itself.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the terms "user device" and/or "computing device" may refer to one or more electronic devices that are configured to directly or indirectly communicate with or over one or more networks. The computing device may include a computer, a desktop computer, a server, a client device, a mobile device, and/or the like. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. An "application" or "application program interface" (API) may refer to software or other data sorted on a computer-readable medium that may be executed by a processor to facilitate the interaction between software components, such as a client-side front-end and/or server-side back-end for receiving data from the client. A "screen" and/or "interface" refers to a generated display, such as one or more graphical user interfaces (GUIs) with which a user may interact, either directly or indirectly (e.g., through a keyboard, mouse, etc.), on a display screen of the user device and/or computing device.

As used herein, the terms "server" and/or "processor" may refer to one or more computing devices, such as processors, storage devices, and/or similar computer components that communicate with client devices and/or other computing devices over a network, such as the Internet or private networks, and, in some examples, facilitate communication among other servers and/or client devices. It will be appreciated that various other arrangements are possible. As used herein, the term "system" may refer to one or more computing devices or combinations of computing devices such as, but not limited to, processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Non-limiting embodiments or aspects of the present disclosure relate to a method and system for navigating through an application in a user device. In some non-limiting embodiments or aspects, the application may be an application configured in the user device. In some non-limiting embodiments or aspects, the present application may also be applicable for website navigation on browsers in the user device. The application may include one or more screens and a plurality of menu options on each of the one or more screens. Each menu option may correspond to a functionality to be performed when the menu option is selected. As an example, the application may include, but is not limited to, an online shopping application, a social media application, a news application, a payment application, and any other service application supported by the user device. The application may also include native applications of the user device. The user device may be in communication with or embedded with one or more sensors. As an example, the one or more sensors may include, but are not limited to, a gyroscope, a pressure sensor, a touch sensor, and an accelerometer. The one or more sensors may detect at least one of an operating hand of a user holding the user device and a number of touch points on one or more screens of the application based on sensor data from the one or more sensors. The number of touch points are detected based on sensor data including information about one or more fingers of the operating hand of the user holding the user device. In an example, the at least one of the operating hand of the user holding the user device and number of touch points on the one or more screens of the application is mapped to the one or more menu options of the application. In some non-limiting embodiments or aspects, the mapping may be predefined for payment options for any payment service provider irrespective of the user using the application and irrespective of the application being used. However, these mappings may be changed by the user and the user may define the mapping for the payment options irrespective of any application being used by the user. In some non-limiting embodiments or aspects, the mapping may be predefined for each application by a user. In some non-limiting embodiments or aspects, the application may also predefine the mapping irrespective of any user using the application. In some non-limiting embodiments or aspects, the mapping may be predefined for any application irrespective of any user using the application based on the number of touch points.

In some non-limiting embodiments or aspects, once the at least one of the operating hand of the user and the number of touch points are detected, the menu option corresponding to the detected at least one of the operating hand of the user and the number of touch points is selected. Each menu option may be associated with one or more menu options in a screen subsequent to the one or more screens. Thereafter, the system provides the one or more menu options associated with the selected menu option on the screen subsequent to the one or more screens. The system may initiate a transaction based on selection of one or more final menu options among the one or more menu options on a final screen of the one or more screens of the application.

In this manner, the present disclosure provides a method for navigating through an application by adapting to the existing screen size of the mobile device and ergonomics of the user operating the user device.

FIG. 1a shows an exemplary architecture 100 for navigating the application in a user device 103 in accordance with some non-limiting embodiments or aspects of the present disclosure. The architecture 100 may include a user device 103 operated by a user 101 and an application navigation system 105. In some non-limiting embodiments or aspects, the user device 103 may include, but is not limited to, a mobile phone, a tablet, and any computing device with a touch screen. The user device 103 may be configured with one or more applications. The one or more applications may include, but are not limited to, a gaming application, a payment application, a social media application, and an online shopping application.

In some non-limiting embodiments or aspects, the application navigation system 105 may be provided in the user device 103 for navigating the one or more applications. In some non-limiting embodiments or aspects, the application navigation system 105 may be in a cloud server. In this scenario, the cloud server may provide one or more services such as providing user defined profiles to the user device 103 which is specific to the user 101 or application defined profiles which are defined by the application itself. Thereafter, the user 101 may navigate through the application based on mapping defined in the application defined profile or user defined profile.

The user device 103 may access the application navigation system 105 from the cloud server and also download profiles comprising mapping information for navigating the application. Each application may comprise one or more screens and a plurality of menu options on each of the one or more screens. Each of the plurality of menu options is associated with a corresponding functionality to be performed when the menu option is selected. The user 101 operating the user device 103 may wish to access the application to perform one or more functions. The operating hand of the user 101 for accessing the application may be one of the left hand or the right hand. The user device 103 is embedded with one or more sensors 102 and comprises a display screen 104 for displaying a plurality of menu options of application. The one or more sensors 102 may include, but are not limited to, a gyroscope, pressure sensor, touch sensor, and accelerometer.

The application navigation system 105 may detect at least one of the operating hand of the user 101 holding the user device 103 and the number of touch points on one or more screens of the application based on sensor data 115. The sensor data 115 may be based on the one or more sensors 102. The operating hand of the user 101 is the hand used by the user 101 for operating the user device 103 and for accessing the application. The number of touch points may be detected based on sensor data 115 which comprises information about one or more fingers of the operating hand of the user 101 touching the user device 103. In some non-limiting embodiments or aspects, the at least one of the operating hand of the user 101 holding the user device 103 and the number of touch points on the one or more screens of the application is mapped to one or more menu options of the application.

The mapping may be predefined by payment service providers. As an example, there may be two payment service providers, payment service provider 1 and payment service provider 2. The same mapping may be predefined for each payment service provider, payment service provider 1 and payment service provider 2, irrespective of the user 101 using the application and irrespective of the application being used by the user 101. For example, the user 101 may be using application 1 and at the payment page, the user 101 may use services of payment service provider 1. The mapping may be predefined in such a way that, if the user 101 is holding the user device 103 in the right hand, the one or more menu options such as menu option 1 and menu option 2 may be provided on a screen of the application. As an example, the menu option 1 and menu option 2 may correspond to a credit card and a debit card, respectively. Similarly, if the user 101 is holding the user device 103 in the left hand, the one or more menu options such as menu option 3 and menu option 4 may be provided on a screen of the application 1. As an example, the menu option 3 and menu option 4 may be wallet option 1 and wallet option 2, respectively. The mapping of the menu options such as card options for the right hand and wallet options for the left hand may be predefined for every payment service provider, for any user 101, and for any application used by the user 101.

In some non-limiting embodiments or aspects, these mappings may be changed by the user 101, and the user 101 may define the mapping for the payment options irrespective of any application being used by the user 101. In some non-limiting embodiments or aspects, the user defined mapping for the payment options is stored in the user profile. As an example, the user 101 may predefine that, if the operating hand is "left hand," then one or more menu options such as wallet options may be provided and if the operating hand is "right hand," then the menu options such as card options may be provided. These mappings may be predefined by the user 101 for any application irrespective of any payment service provider.

In some non-limiting embodiments or aspects, the mapping may be predefined by the user 101 for each application. The at least one of the operating hand of the user 101 holding the user device 103 and the number of touch points on the one or more screens of the application is mapped to one or more menu options of the application based on the predefined user profile of each user 101 holding the user device 103. In this scenario, the mapping is based on user 101 preference. As an example, the profile of each user 101 holding the user device 103 may be stored in the user device 103 or in the cloud server associated with the application navigation system 105. The user profile may include details associated with the application and the corresponding mapping of the menu options of the application with at least one of the operating hand of the user 101 and the number of touch points.

In some non-limiting embodiments or aspects, the one or more menu options in each screen of the application are mapped with at least one of the operating hand of the user 101 and the number of touch points. The below Table 1 indicates an exemplary mapping of the one or more menu options with at least one of the operating hand of the user 101 and the number of touch points.

TABLE 1

| User | Application | |
|---|---|---|
| User 1 | Application 1 | Screen 1 - |
| | | Menu option 1 - number of touch points "one", |
| | | Menu option 2 - number of touch points "two", and |
| | | Menu option 3 - number of touch points "three". |
| | | Screen 2 - |
| | | Menu option 4 - number of touch points "two", |
| | | Menu option 5 - number of touch points "three", |
| | | Menu option 6 - number of touch points "four", and |
| | | Menu option 7 - number of touch points "one". |
| User 2 | Application 2 | Screen A - |
| | | Menu option 1 - Left hand of the user 2 and number of touch points "two", and |
| | | Menu option 2 - left hand of the user 2 and number of touch points "three". |
| | | Screen B - |
| | | Menu option 3 - right hand of the user 2 and number of touch points "three", |
| | | Menu option 4 - right hand of the user 2 and number of touch points "two", |
| | | Menu option 5 - right hand of the user 2 and number of touch points "one". |

As an example, two users, user 1 and user 2, may be associated with the user device 103. The user 1 may be associated with application 1 and the user 2 may be associated with application 2. The application 1 may comprise two screens, namely, screen 1 and screen 2. The screen 1 may include three menu options, menu option 1, menu option 2, and menu option 3. The menu option 1 may be mapped to number of touch points "one". The menu option 2 may be mapped to number of touch points "two" and the menu option 3 may be mapped to number of touch points "three". The one or more sensors 102 may detect the number of touch points on the screen 1 to be "two" based on the sensor data 115. When the number of touch points is detected as "two," the menu option 2 may be selected by the application navigation system 105. When the third menu option is selected, the application navigation system 105 may provide one or more menu options corresponding to the selected menu option in a screen subsequent to the one or more screens of the application. As an example, the one or more menu options corresponding to the selected menu option 2 may be provided in the screen 2. The screen 2 may include four menu options, menu option 4, menu option 5, menu option 6, and menu option 7 corresponding to the selected menu option 2. The menu option 4 may be mapped to number of touch points "two," the menu option 5 may be mapped to number of touch points "three," the menu option 6 may be mapped to number of touch points "four," and the menu option 7 may be mapped to number of touch points "one." The one or more sensors 102 may detect the number of touch points on the screen 2 to be "one" based on the sensor data 115. When the number of touch points is detected as "one," the menu option 7 may be selected by the application navigation system 105. Similarly, the application 2 may include two screens, screen A and screen B. Screen A may include menu option 1 which is mapped to left hand of the user 2 and number of touch points "two", and menu option 2 which is mapped to left hand of the user 2 and number of touch points "three." Screen B may include menu option 3 which is mapped to the right hand of the user 2 and number of touch points "three," menu option 4 which is mapped to the right hand of the user 2 and number of touch points "two," and menu option 5 which is mapped to the right hand of the user 2 and number of touch points "one."

In some non-limiting embodiments or aspects, the process of detecting the at least one of the operating hand of the user 101 and the number of touch points is repeated until one or more final menu options of the application 2 is selected. Once the one or more final menu options is selected, the application navigation system 105 may initiate a transaction based on the selected one or more final menu options. As an example, the transaction may be transmitting payment credentials to a merchant associated with the application 2 or requesting an authentication from user 101 to retrieve details of user 101.

In some non-limiting embodiments or aspects, the mapping may be predefined by the application itself. So irrespective of any user 101 using the application, the mapping may be predefined, and based on the predefined mapping as per the application, the user 101 may navigate in the application. As an example, the cab booking application may predefine the mapping such that if the operating hand of the user 101 is the left hand then one or more menu options such as menu option 1, menu option 2, and menu option 3 may be provided. If the operating hand of the user 101 is the right hand then one or more menu options such as menu option 4, menu option 5, and menu option 6 may be displayed. So irrespective of any user 101 using the cab booking application, when the operating hand is "left hand," the menu options such as menu option 1, menu option 2, and menu option 3 may be provided. Similarly, if the operating hand is "right hand," the menu options such as menu option 4, menu option 5, and menu option 6 may be provided.

In some non-limiting embodiments or aspects, the mapping may be predefined for any application, based the number of touch points. As an example, irrespective of any application being used, if the number of touch points is two then second menu option of the application may be provided. Similarly, if the number of touch points is four, then the fourth menu option of the application may be provided.

Figure 1B:
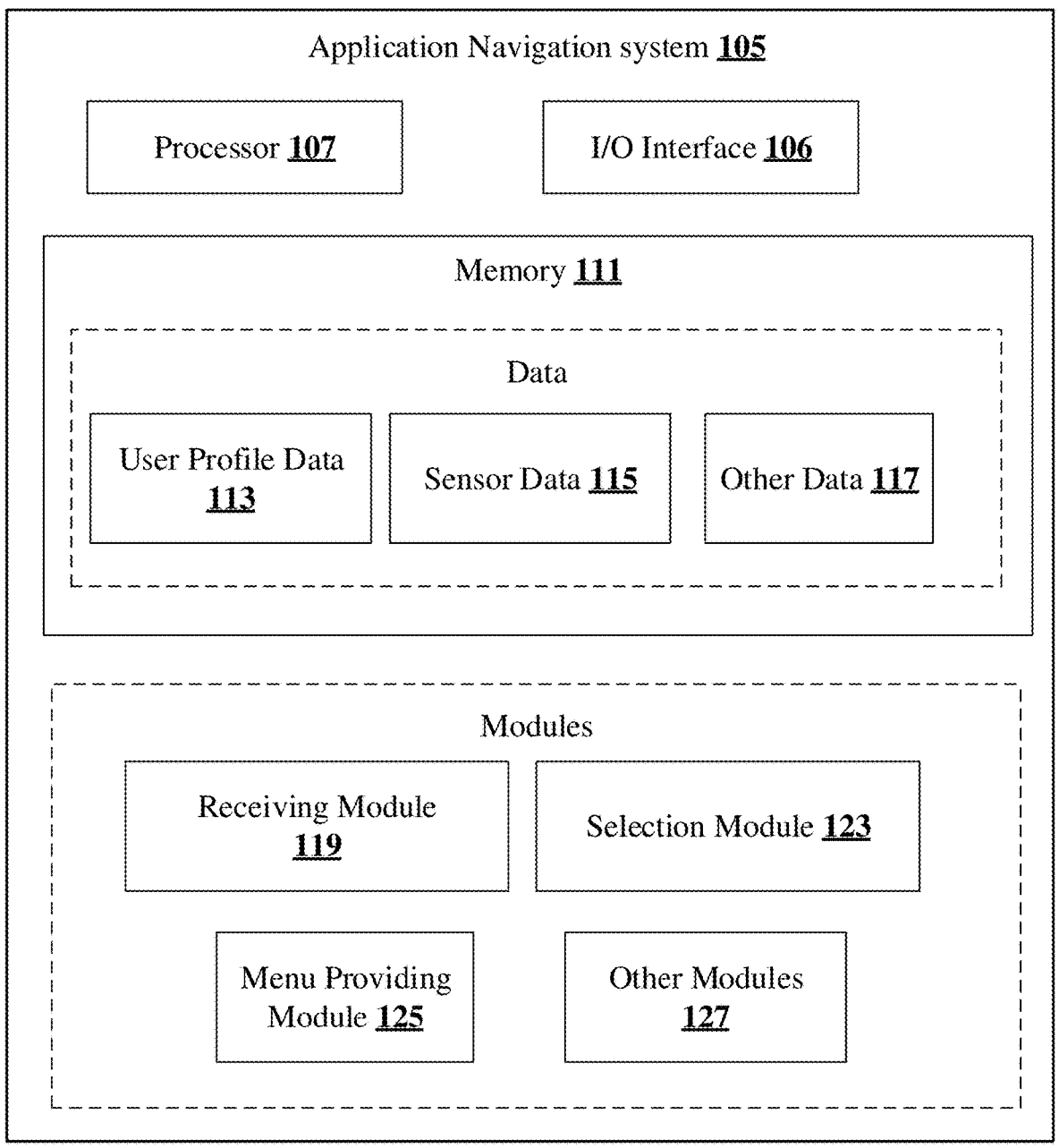
FIG. 1b shows a block diagram of an application navigation system in accordance with some non-limiting embodiments or aspects of the present disclosure.

FIG. 1b shows a block diagram of an application navigation system 105 in accordance with some non-limiting embodiments or aspects of the present disclosure. In some implementations, the application navigation system 105 may include data and modules. As an example, the data is stored in a memory 111 of the application navigation system 105 as shown in the FIG. 1b. In some non-limiting embodiments or aspects, the data may include user profile data 113, sensor data 115, and other data 117. In the illustrated FIG. 1b, modules are described herein in detail.

In some non-limiting embodiments or aspects, the data may be stored in the memory 111 in the form of various data structures. Additionally, the data can be organized using data models, such as relational or hierarchical data models. The other data 117 may store data, including temporary data and temporary files, generated by the modules for performing the various functions of the application navigation system 105. As an example, the other data 117 may also include data associated with the one or more applications. The other data 117 may also include data associated with mapping of one or more menu options of the application with at least one of the operating hand of the user 101 and the number of touch points, wherein the mapping is predefined by the application navigation system 105.

In some non-limiting embodiments or aspects, the data stored in the memory 111 may be processed by the modules of the application navigation system 105. The modules may be stored within the memory 111. In an example, the modules communicatively coupled to the processor 107 configured in the application navigation system 105 may also be present outside the memory 111 as shown in FIG. 1b and implemented as hardware. The processor 107 may be configured to perform the functionalities of the application navigation system 105. As used herein, the term "module" may refer to a software component, a hardware component, an Application Specific Integrated Circuit (ASIC), an electronic circuit, a processor 107 (shared, dedicated, or group), and memory 111 that executes one or more software or firmware programs, a combinational logic circuit, and/or other suitable components that provide the described functionality.

In some non-limiting embodiments or aspects, the modules may include, for example, a receiving module 119, a selection module 123, a menu providing module 125 and other modules 127. The other modules 127 may be used to perform various miscellaneous functionalities of the application navigation system 105. It will be appreciated that such aforementioned modules may be represented as a single module or a combination of different modules. Furthermore, a person of ordinary skill in the art will appreciate that in an implementation, the one or more modules may be stored in the memory 111, without limiting the scope of the disclosure. The modules when configured with the functionality defined in the present disclosure will result in a novel hardware.

In some non-limiting embodiments or aspects, the receiving module 119 may be configured to receive sensor data 115 from one or more sensors 102 embedded in the user device 103 through the I/O interface 106 of the application navigation system 105. The one or more sensors 102 may include, but are not limited to, a gyroscope, a pressure sensor, touch sensor, accelerometer, and any sensor capable of detecting the operating hand of the user 101 holding the user device 103 and touch points on the touch screen of the user device 103. The one or more sensors 102 may detect at least one of the operating hand of the user 101 holding the user device 103 and the number of touch points on one or more screens of an application in the user device 103. The detected data is stored as the sensor data 115.

In some non-limiting embodiments or aspects, the receiving module 119 may also receive information about one or more users associated with the user device 103 and preferences of each of the one or more users while accessing one or more applications in the user device 103. In some non-limiting embodiments or aspects, at least one of the operating hand of the user 101 and the number of touch points is mapped to one or more menu options of the application. As an example, there may be two users associated with the user device 103, user 1 and user 2. The preferences of user 1 and user 2 for navigating the application is stored as user profile data 113.

In some non-limiting embodiments or aspects, the selection module 123 may be configured to select a menu option from a plurality of menu options on the one or more screens of the application. The selected menu option may correspond to the detected at least one of the operating hand of the user 101 and number of touch points on the one or more screens of the application by the one or more sensors 102. The operating hand of the user 101 and the number of touch points are mapped to one or more menu options of the application. When the operating hand of the user 101 is detected as left hand, the one or more menu options mapped for the left hand of the user 101 are selected. Similarly, if the operating hand of the user 101 is detected as right hand, then the menu options mapped for the right hand of the user 101 are selected. Likewise, the number of touch points is also mapped to one or more menu options.

As an example, if the number of touch point is "one" with one finger touching the screen of the application, it may be mapped to menu option 1. Similarly, if the number of touch point is "three" with three fingers touching the screen of the application, it may be mapped to menu option 3. Therefore, when the number of touch points are detected as "three," the selection module 123 may select the menu option 3. In some non-limiting embodiments or aspects, at each screen of the application the one or more sensor may detect at least one of the operating hand of the user 101 and the number of touch points. At each screen, the one or more sensor 102 may detect at least 8-10 number of touch points as the number of touch points is based on the number of fingers touching the screen of the application.

In some non-limiting embodiments or aspects, menu providing module 125 may be configured to provide the one or more menu options based on the selected menu option. The one or more menu options may be provided on a screen subsequent to the one or more screens of the application. In some non-limiting embodiments or aspects, the subsequent screen may be a pop-up in the same screen. As an example, if the first screen comprises one or more menu options such as menu option 1 and menu option 2 and if the menu option 2 is selected by the selection module 123, the menu providing module 125 may provide the one or more menu options corresponding to the selected menu option 2 in a second screen of the application which is subsequent to the first screen of the application. In some non-limiting embodiments or aspects, the menu providing module 125 may provide the one or more menu options in a screen subsequent to the one or more screens of the application until one or more final menu options are selected. The one or more final menu options may be provided on a final screen of the application. Once the one or more final menu options are selected, the application navigation system 105 may initiate a transaction corresponding to the selected one or more final menu options.

Figure 2A:
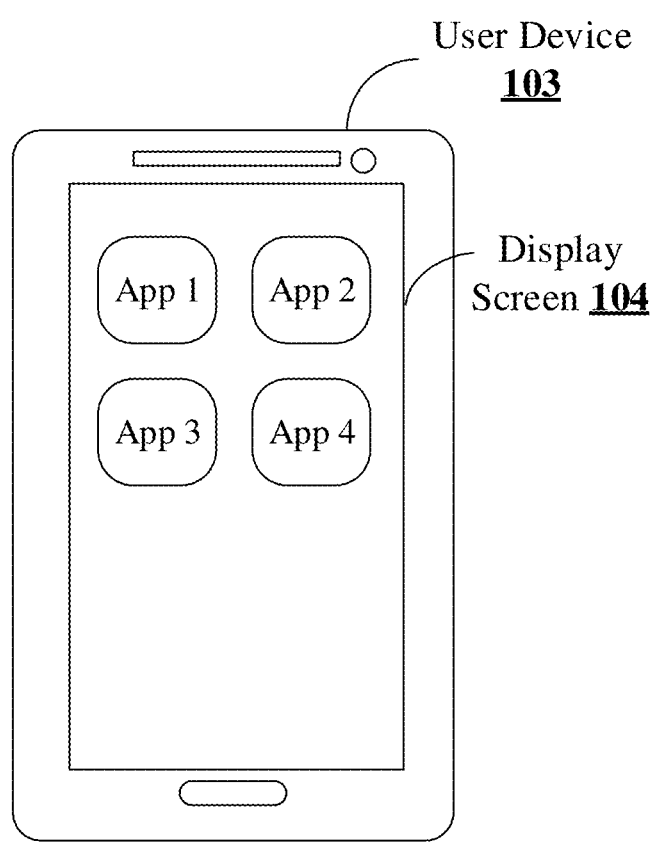
FIGS. 2a-2d illustrate exemplary representations for navigating through an application in a user device in accordance with some non-limiting embodiments or aspects of the present disclosure.

FIGS. 2a-2d illustrate exemplary representations for navigating an application in a user device 103 in accordance with some non-limiting embodiments or aspects of the present disclosure. As shown in FIG. 2a, the user device 103 may include one or more applications such as App 1, App 2, App 3, and App 4, which are displayed on the display screen 104 of the user device 103, and the user device 103 may be operated by user 101. As an example, the user 101 holding the user device 103 may select App 1. The user 101 may have predefined at least one of the operating hand of the user 101 holding the user device 103 and the number of touch points on the one or more screens of the App 1 to one or more menu options of the App 1 and data associated with the mapping is stored in user profile of the user 101. The App 1 may be a cab booking application.

Figure 2B:
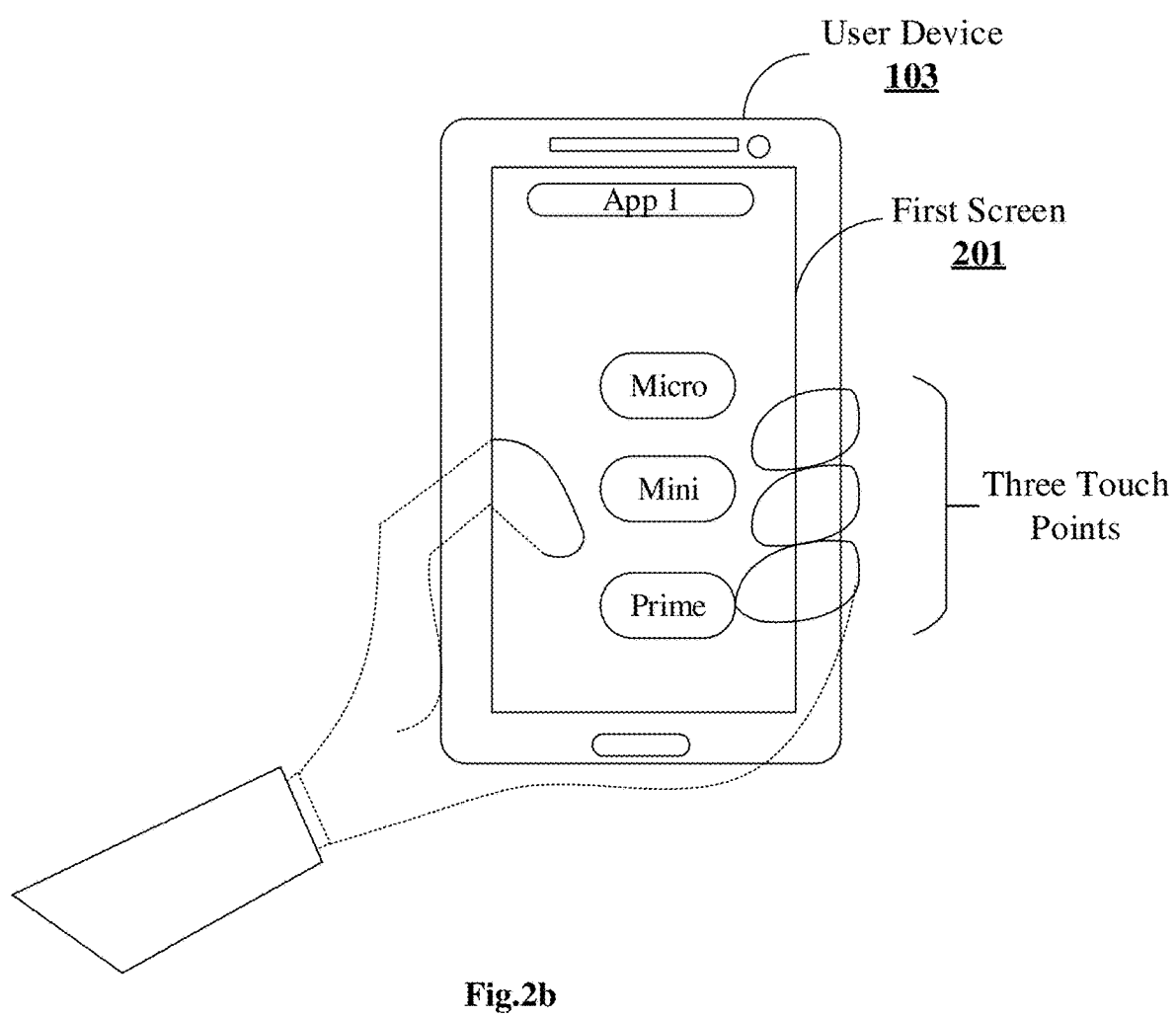

As shown in FIG. 2b, when the App 1 is selected, the one or more sensors 102 may detect at least one of the operating hand of the user 101 and the number of touch points on one or more screens of the App 1. The one or more sensors 102 may detect the operating hand of the user 101 to be "left hand." The one or more menu options of the App 1 mapped to the left hand of the user 101 is displayed on the first screen 201 of the App 1. As an example, the one or more menu options that are mapped to the left hand of the user 101 based on the user profile of user 101 are "Micro," "Mini," and "Prime." If the operating hand of the user 101 is detected as "right hand" then the one or more menu options mapped to the right hand of the user 101 may be displayed on the first screen 201 of the App 1. As an example, the one or more menu options mapped to the right hand of the user 101 may be "Auto" and "Share Cabs."

The one or more menu options may be displayed on the first screen 201 of the App 1 as shown in FIG. 2b. At each screen, the one or more sensors 102 detect the operating hand of the user 101 and the number of touch points on the screen of the App 1. At the first screen 201, the one or more sensors 102 may detect the number of touch points as "three." The user 101 may touch the first screen 201 using three fingers of the left hand. In this scenario, the number of touch points "three" is mapped with the menu option "Prime" and hence the menu option "Prime" is selected by the application navigation system 105. Further, the one or more menu options corresponding to the selected menu option "Prime" is provided on a second screen 203 which is subsequent to the first screen 201.

Figure 2C:
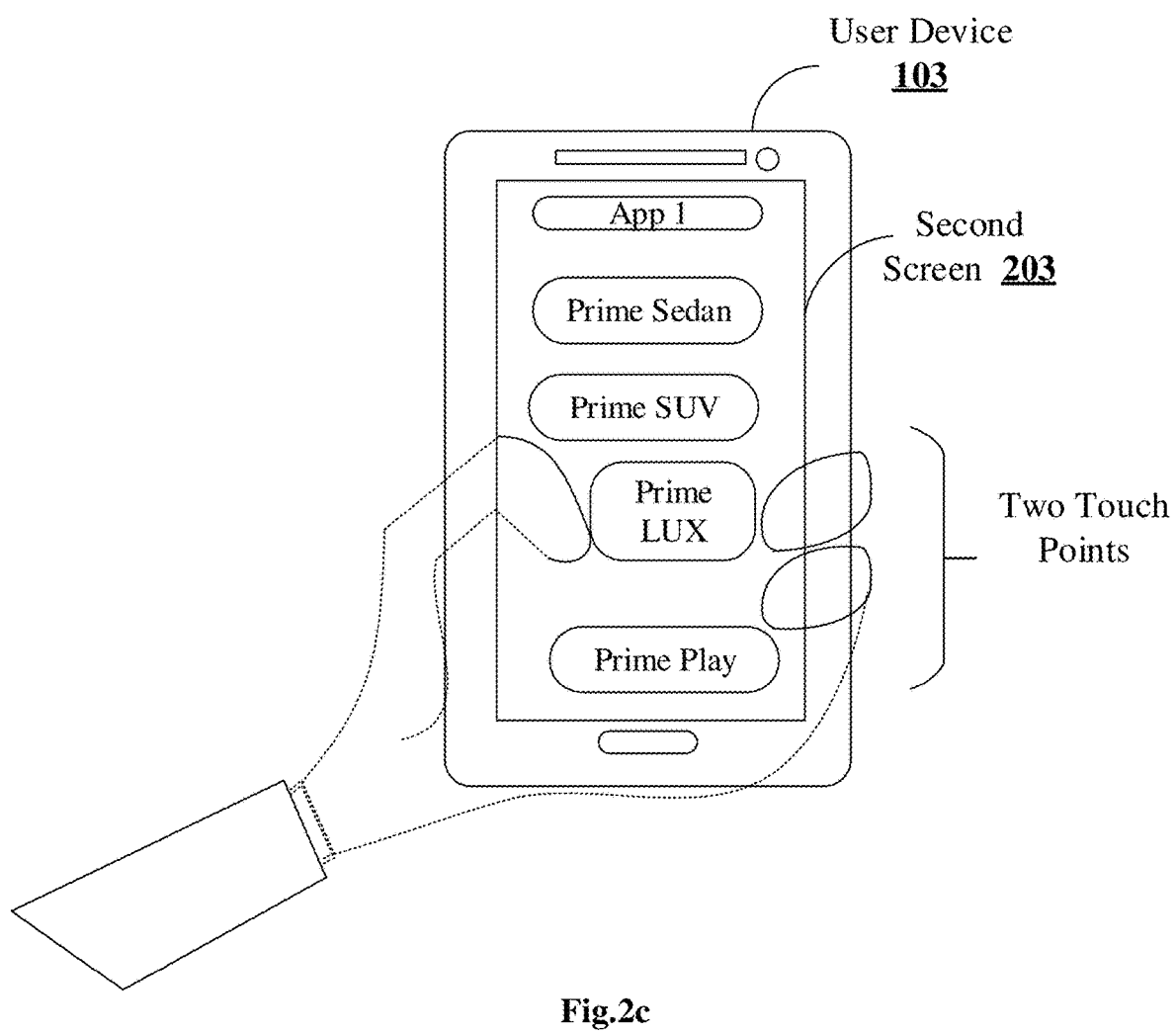

The one or more menu options corresponding to the selected menu option "Prime" are "Prime Sedan," "Prime SUV," "Prime Lux," and "Prime Play" which are provided on the second screen 203 of the App 1, as shown in FIG. 2c. The one or more sensors 102 may detect at least one of the operating hand of the user 101 holding the user device 103 and the number of touch points on the second screen 203 of the App 1. As an example, the one or more sensors 102 may detect that the user 101 is holding the user device 103 in the left hand and may touch the second screen 203 using two fingers of the left hand. In this scenario, the number of touch points is "two." The number of touch points "two" is mapped with the menu option "Prime Play" based on the profile of the user 101. The menu option "Prime Play" is selected. The process of detection of at least one of the operating hand of the user 101 and the number of touch points and selection of menu option based on the detection continues until one or more final menu options is selected for which there are no further one or more menu options.

Figure 2D:
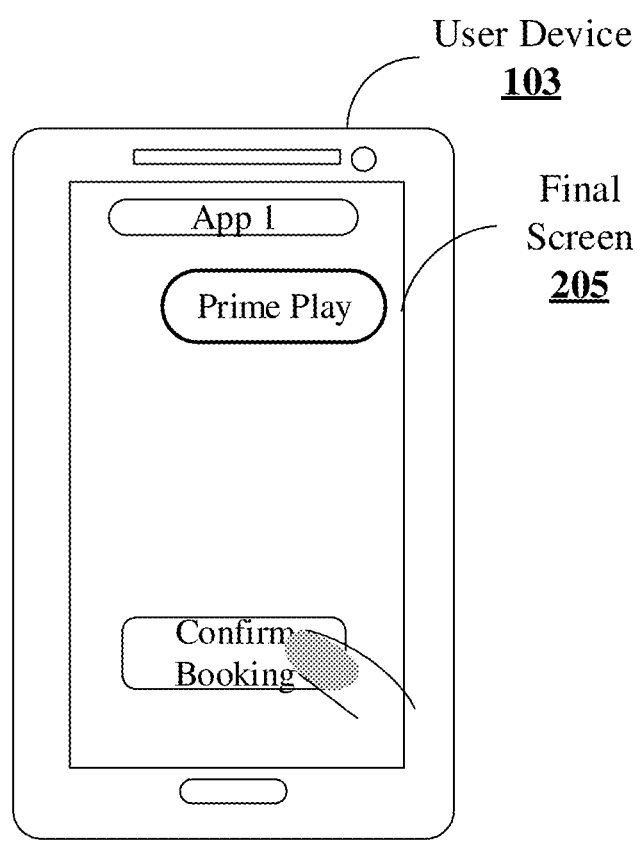

In this scenario, the menu option "Prime Play" is the final menu option which is displayed on a final screen 205 of the App 1, as shown in FIG. 2d. Once the final menu option is selected by the user 101, the application navigation system 105 may initiate transaction corresponding to the selected menu option. In this scenario, the transaction is a non-payment transaction wherein once the "Prime Play" is selected, the application may request the user 101 to confirm the booking, and once the booking is confirmed by the user 101, the transaction comprises providing the cab booking request to the server associated with App 1.

In some non-limiting embodiments or aspects, the mapping may be predefined by the application itself for any user 101 using the application. In this scenario, the cab booking application itself may predefine mapping of at least one of the operating hand of the user 101 and the number of touch points to one or more menu options in the cab booking application. Based on application specific mapping, the navigation may be performed by the user 101.

FIGS. 3a-3d illustrate another set of exemplary representations for navigating through an application in a user device in accordance with some non-limiting embodiments or aspects of the present disclosure. As an example, the user 101 may use App 1 for shopping an item. The payment options may be displayed at payment page of the App 1 for buying the item. The displayed payment options may be based on mapping predefined by payment service providers selected by the user 101 for buying the item. However, the user 101 may override this mapping and invoke user specific mapping at the payment page for the payment options. The user 101 may have predefined the mapping for the payment options irrespective of any application. For example, user 101 may predefine that if the operating hand of the user 101 is "left hand" then the card options are displayed and if the operating hand of the user 101 is "right hand" then the wallet options are displayed. These payment options of user 101 may be applicable for any application irrespective of any payment service provider. So, whenever the user 101 is at the payment page of any application, the payment options may be displayed based on the predefined mapping for the payment options.

Figure 3A:
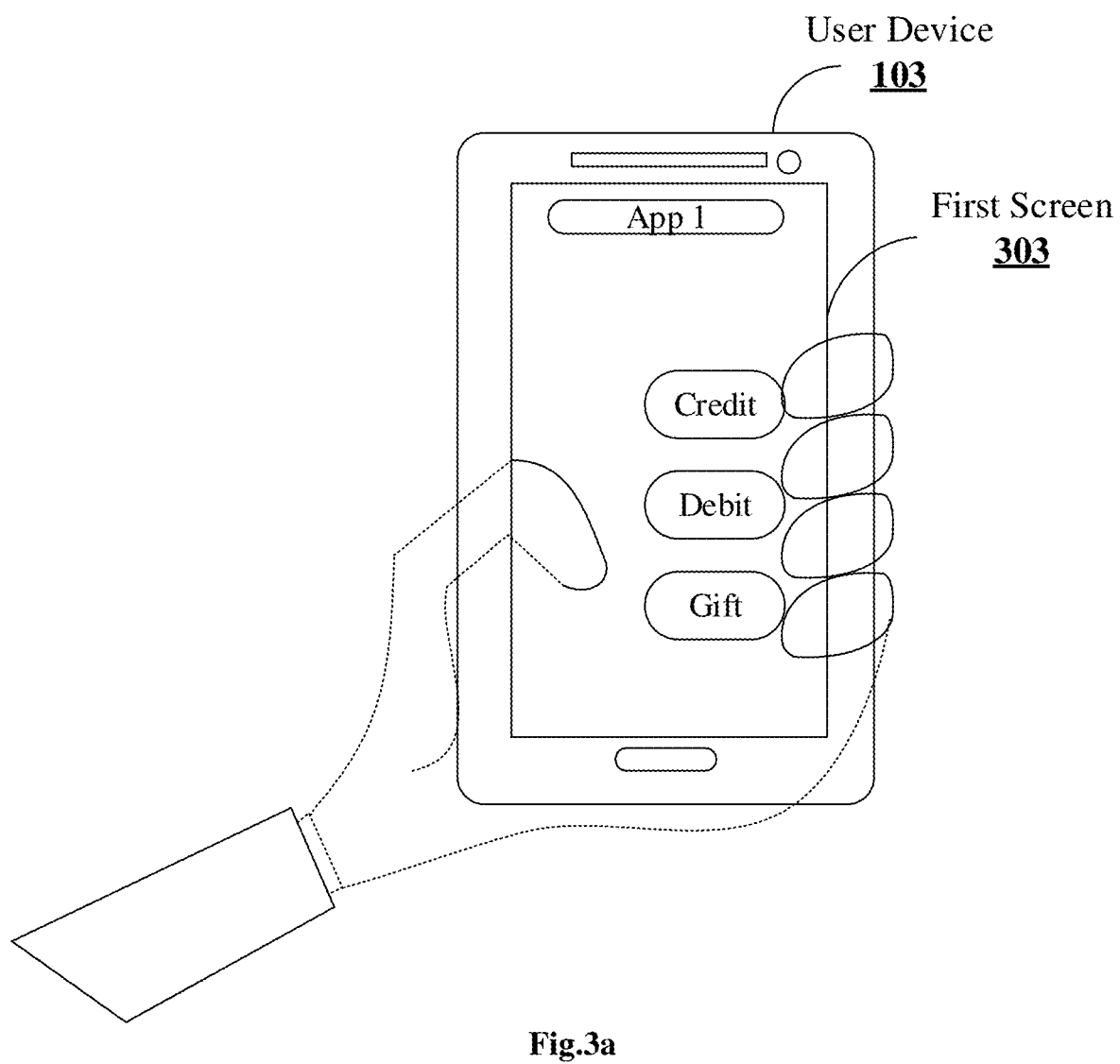
FIGS. 3a-3d illustrate another set of exemplary representations for navigating through an application in a user device in accordance with some non-limiting embodiments or aspects of the present disclosure.

As an example, the one or more sensors 102 may detect the operating hand of the user 101 as "left hand." The left hand may be mapped to card options such as "credit card," "debit card," and "gift card" as shown in FIG. 3a and hence the card options may be displayed on the next screen of the App 1 which may be termed as first screen 303 as shown in FIG. 3a. In another scenario, if the one or more sensors 102 detect the operating hand of the user 101 as "right hand", the wallet options mapped to the right hand such as wallet option 1, wallet option 2, and wallet option 3 may be displayed on the first screen 303 of the App 1.

As an example, the one or more sensors 102 may detect the operating hand as the left hand and hence the one or more card options are displayed on the first screen 303 in the App 1 as shown in FIG. 3a. At this instant, the one or more sensors 102 may detect at least one of the operating hand of the user 101 and the number of touch points in the first screen 303 of the App 1. The one or more sensors 102 may detect that the user 101 has changed the operating hand. The one or more sensors 102 may detect the operating hand of the user 101 as "right hand."

Figure 3B:
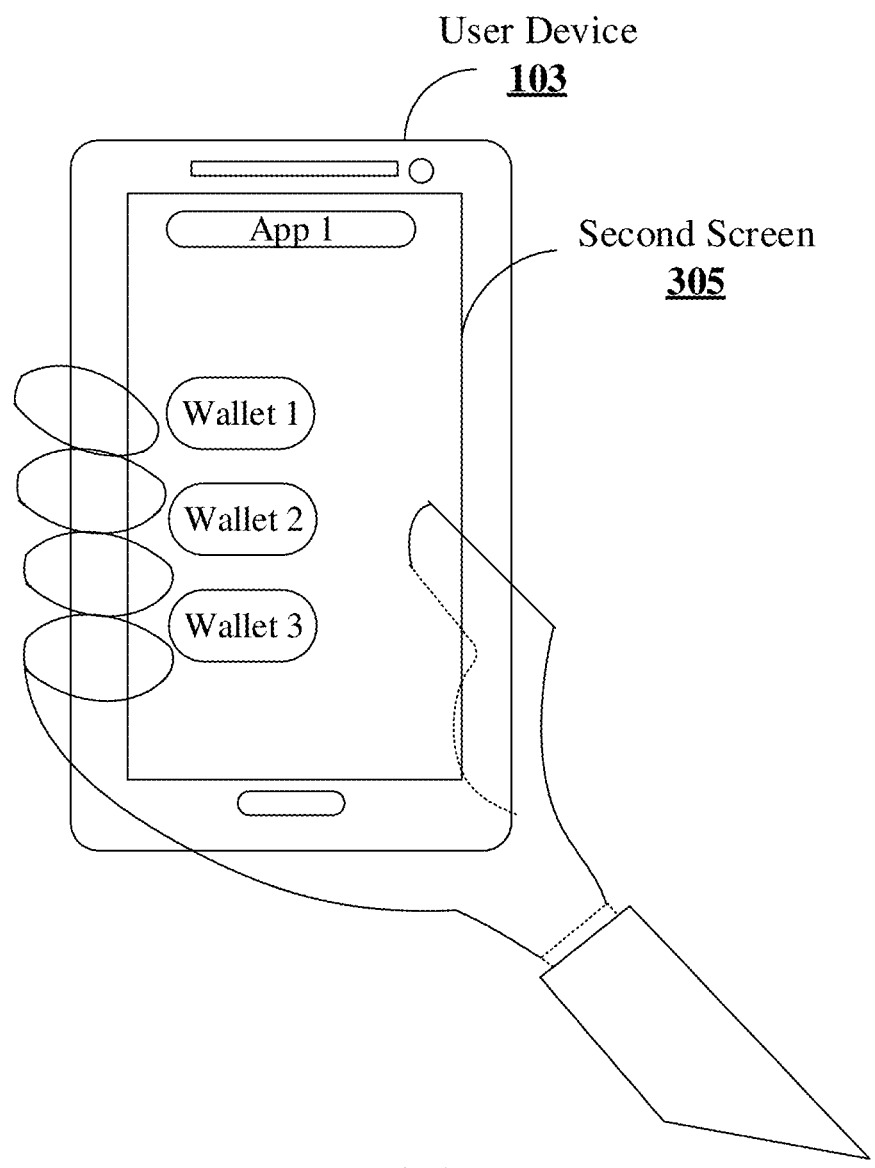

Therefore, the one or more menu options corresponding to the right hand of the user 101 are displayed on the second screen 305 of the App 1, as shown in FIG. 3b. The one or more menu options corresponding to the right hand may be wallet options such as "Wallet 1," "Wallet 2," and "Wallet 3." Wallet 1 may be associated with entity 1, Wallet 2 may be associated with entity 2, and Wallet 3 may be associated with entity 3. At the second screen 305, the one or more sensors 102 may detect at least one of the operating hand of the user 101 and the number of touch points.

Figure 3C:
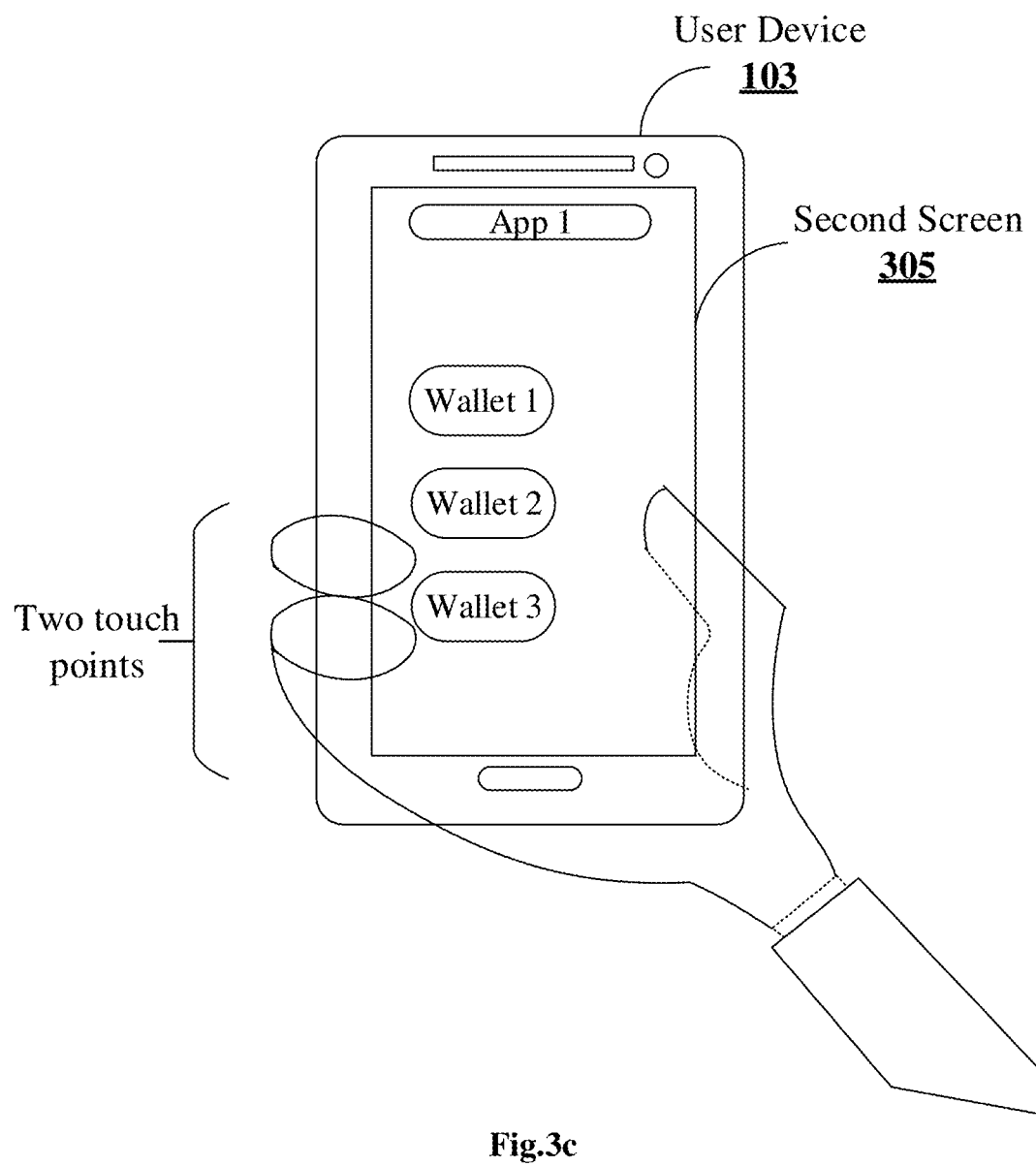
Figure 3D:
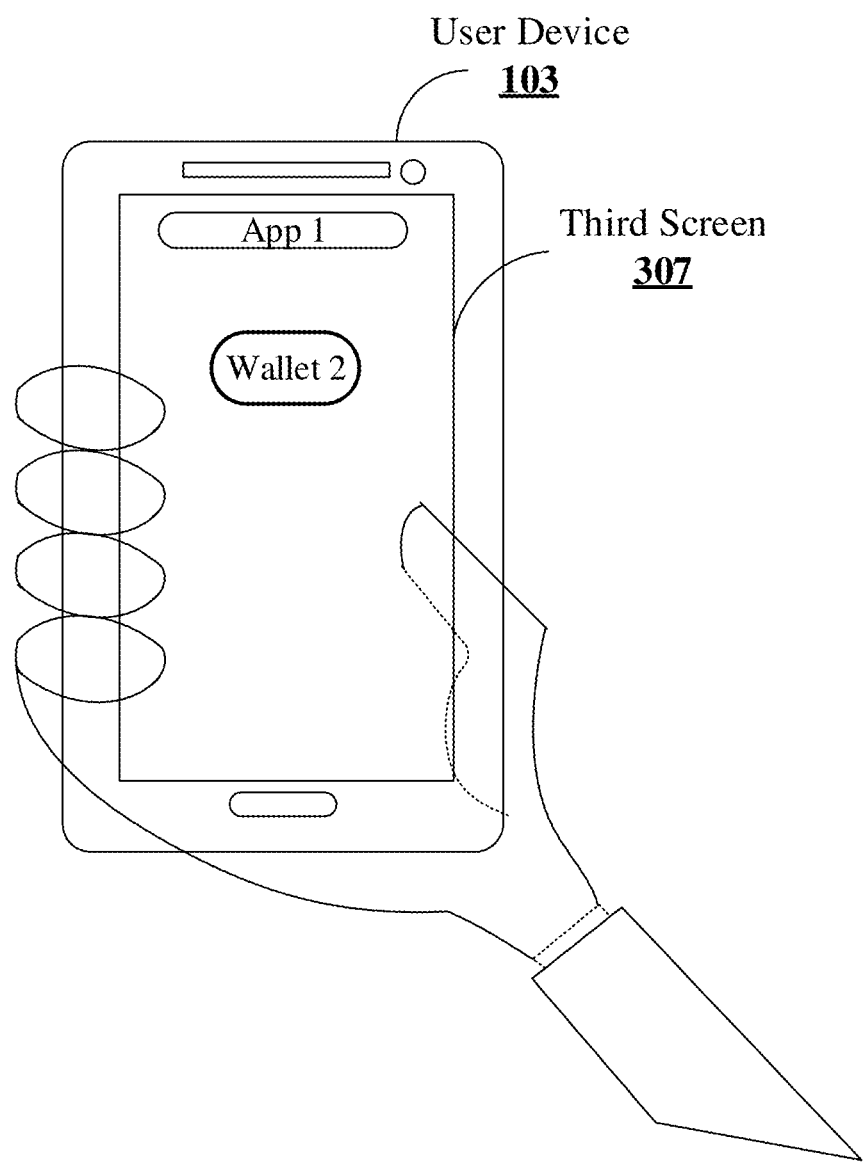

The one or more sensors 102 may detect that the user 101 is holding the user device 103 in the right hand and the number of touch points are "two," as shown in FIG. 3c. The number of touch points "two" is associated with Wallet 2. Therefore, Wallet 2 is selected and Wallet 2 is displayed on the third screen 307 of the App 1, as shown in FIG. 3d.

Wallet 2 is the final menu option of the App 1 as there are no further menu options associated with Wallet 2. Therefore, Wallet 2 may be selected by the user 101 to initiate the transaction for payment. So, when Wallet 2 is selected, the payment credentials may be transmitted to the merchant to complete the payment transaction for buying the item.

Figure 3E:
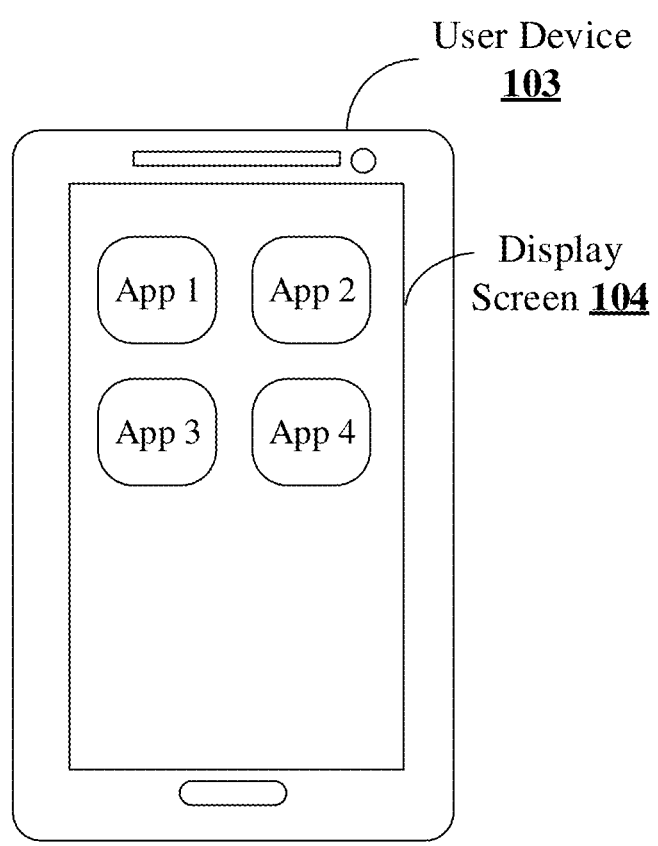
FIGS. 3e-3h illustrate another set of exemplary representations for navigating through an application in a user device in accordance with some non-limiting embodiments or aspects of the present disclosure.

FIGS. 3e-3h illustrate exemplary representations for navigating an application in a user device 103 in accordance with some non-limiting embodiments or aspects of the present disclosure. As shown in FIG. 3e, the user device 103 may include one or more applications such as App 1, App 2, App 3, and App 4 which are displayed on the display screen 104 of the user device 103 and the user device 103 may be operated by user 101. As an example, the user 101 holding the user device 103 may select App 1. The App 1 may be a book review application. As shown in FIG. 3e, when the App1 is selected, the one or more sensors 102 may detect at least one of the operating hand of the user 101 and number of touch points on one or more screens of the App 1. The one or more sensors 102 may detect the operating hand of the user 101 to be "left hand." The one or more menu options of the App 1 mapped to the left hand of the user 101 is displayed on the first screen 201 of the App 1.

Figure 3F:
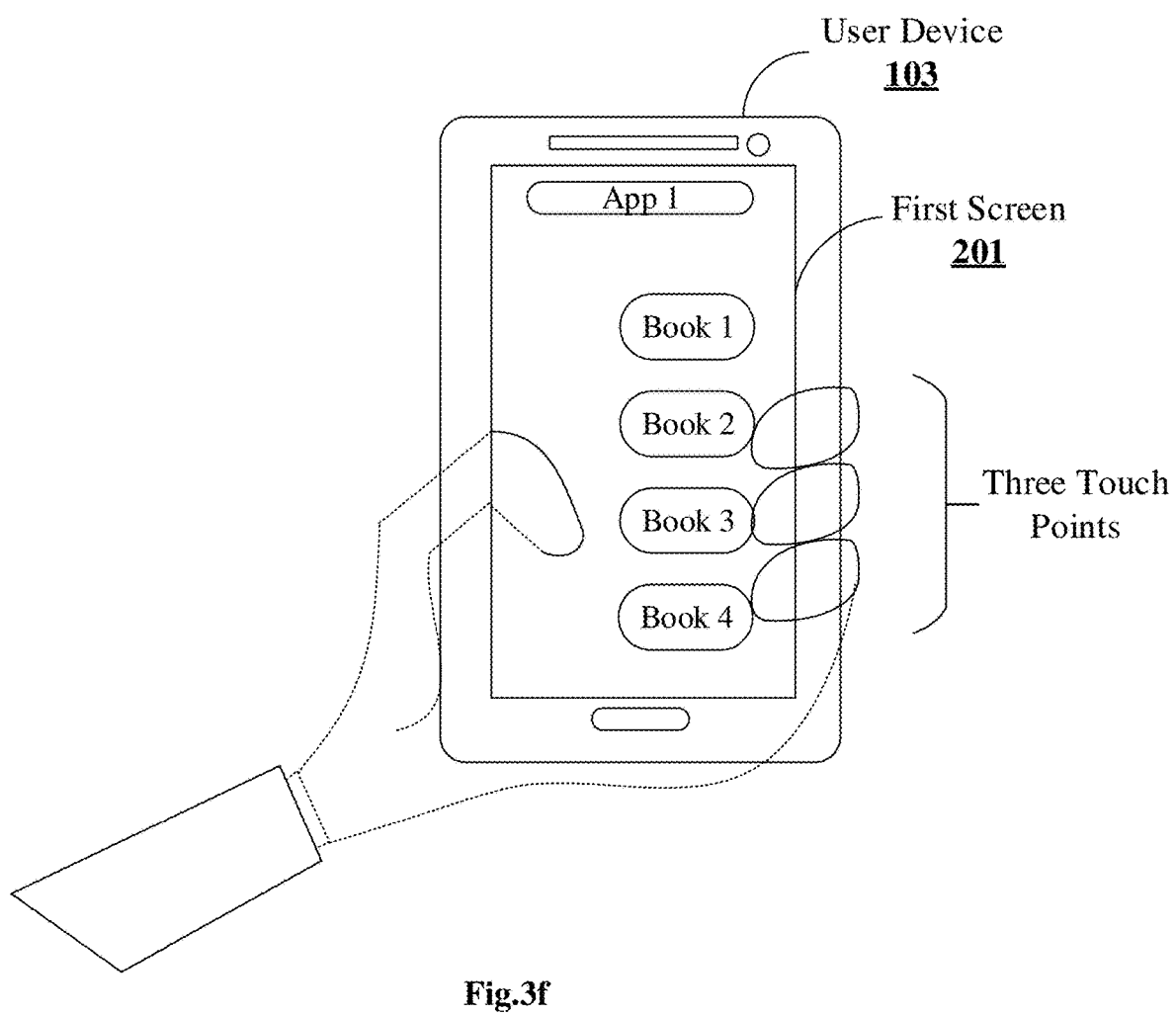

As an example, the one or more menu options which are mapped to the left hand of the user 101 based on the user profile are "Book 1," "Book 2," "Book 3," and "Book 4." The one or more menu options may be displayed on the first screen 201 of the App 1 as shown in FIG. 3f. At each screen, the one or more sensors 102 detects the operating hand of the user 101 and the number of touch points on the screen of the App 1. At the first screen 201, the one or more sensors 102 may detect the number of touch points as "three." The user 101 may touch the first screen 201 using three fingers of the left hand. In this scenario, the number of touch points "three" is mapped with the menu option "Book 3" and hence the menu option "Book 3" is selected by the application navigation system 105. Further, the one or more menu options corresponding to the selected menu option "Book 3" is provided on a second screen 203 which is subsequent to the first screen 201.

Figure 3G:
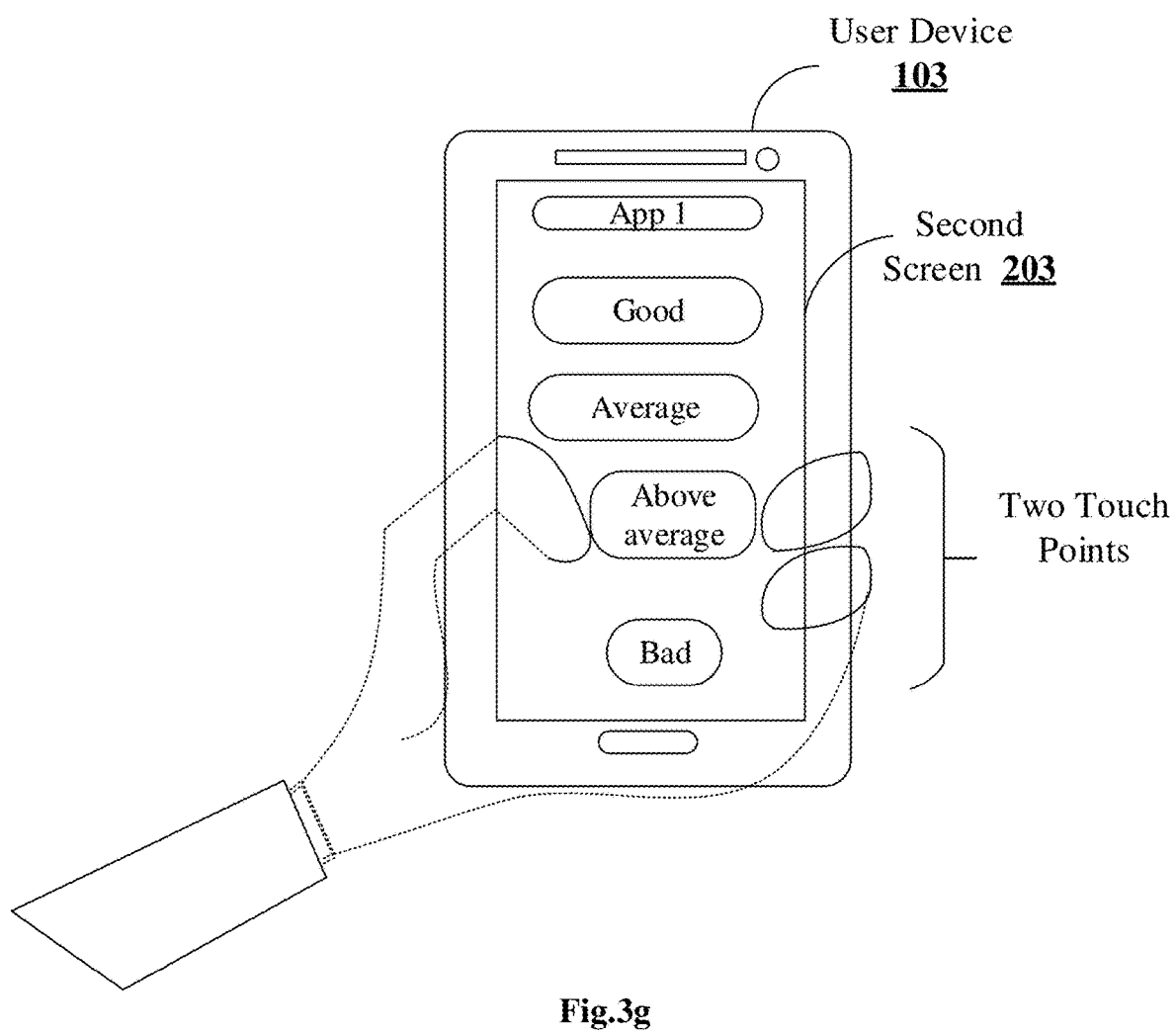

The one or more menu options corresponding to the selected menu option "Book 3" are "Good," "Average," "Above average," and "Bad", which are provided on the second screen 203 of the App 1, as shown in FIG. 3g. The one or more sensors 102 may detect at least one of the operating hand of the user 101 holding the user device 103 and the number of touch points on the second screen 203 of the App 1. As an example, the one or more sensors 102 may detect that the user 101 is holding the user device 103 in the left hand and may touch the second screen 203 using two fingers of the left hand. In this scenario, the number of touch points is "two." The number of touch points "two" is mapped with the menu option "Average" based on the profile of the user 101. The menu option "Average" is selected. The process of detection of at least one of the operating hand of the user 101 and the number of touch points and selection of menu option based on the detection continues until one or more final menu options is selected for which there are no further one or more menu options.

Figure 3H:
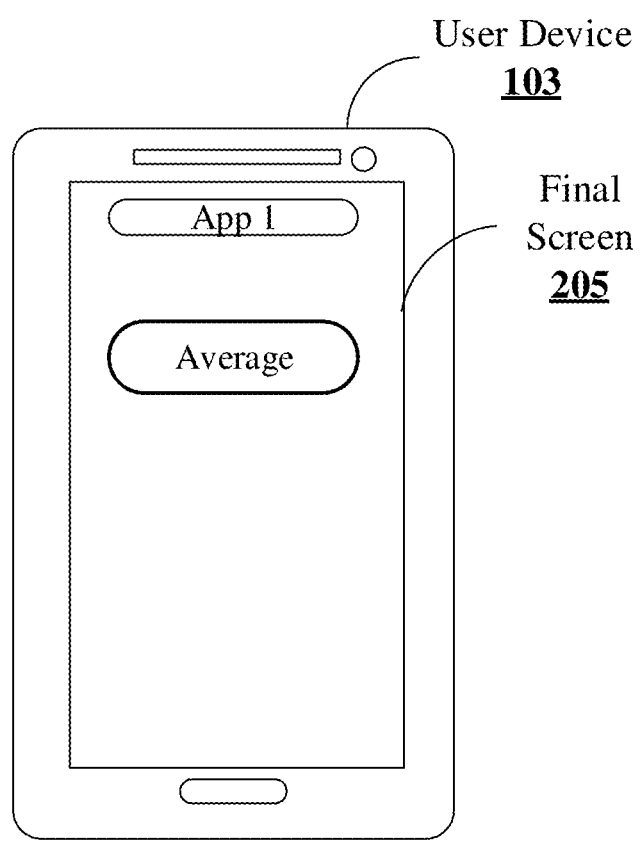

In this scenario, the menu option "Average" is the final menu option which is displayed on a final screen 205 of the App 1, as shown in FIG. 3h. Once the final menu option is selected by the user 101, the application navigation system 105 may initiate a transaction corresponding to the selected menu option. In this scenario, since the App 1 is a book review application, the transaction may be a non-payment transaction such as providing review information for the selected book which is Book 3.

Figure 3I:
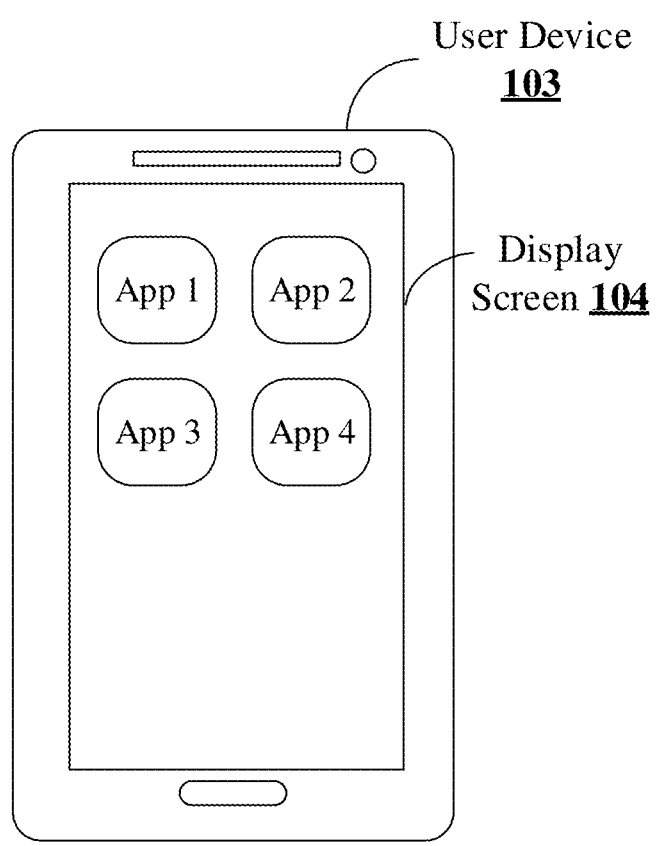
FIGS. 3i-3l illustrate another set of exemplary representations for navigating through an application in a user device in accordance with some non-limiting embodiments or aspects of the present disclosure.

FIGS. 3i-3l illustrate exemplary representations for navigating an application in a user device 103 in accordance with some non-limiting embodiments or aspects of the present disclosure. As shown in FIG. 3i, the user device 103 may include one or more applications such as App 1, App 2, App 3, and App 4, which are displayed on the display screen 104 of the user device 103 and the user device 103 may be operated by user 101. As an example, the user 101 holding the user device 103 may select App 1. The at least one of the operating hand of the user 101 holding the user device 103 and the number of touch points are mapped to one or more menu options of the App 1. The mapping is predefined irrespective of any user 101 using the App 1 and for any application. Since the mapping is predefined based on at least one of the operating hand of the user 101 and the number of touch points for any application, the user 101 may not remember the mappings and may be easy for the user 101 to navigate the application. As an example, the App 1 may be a shopping application.

Figure 3J:
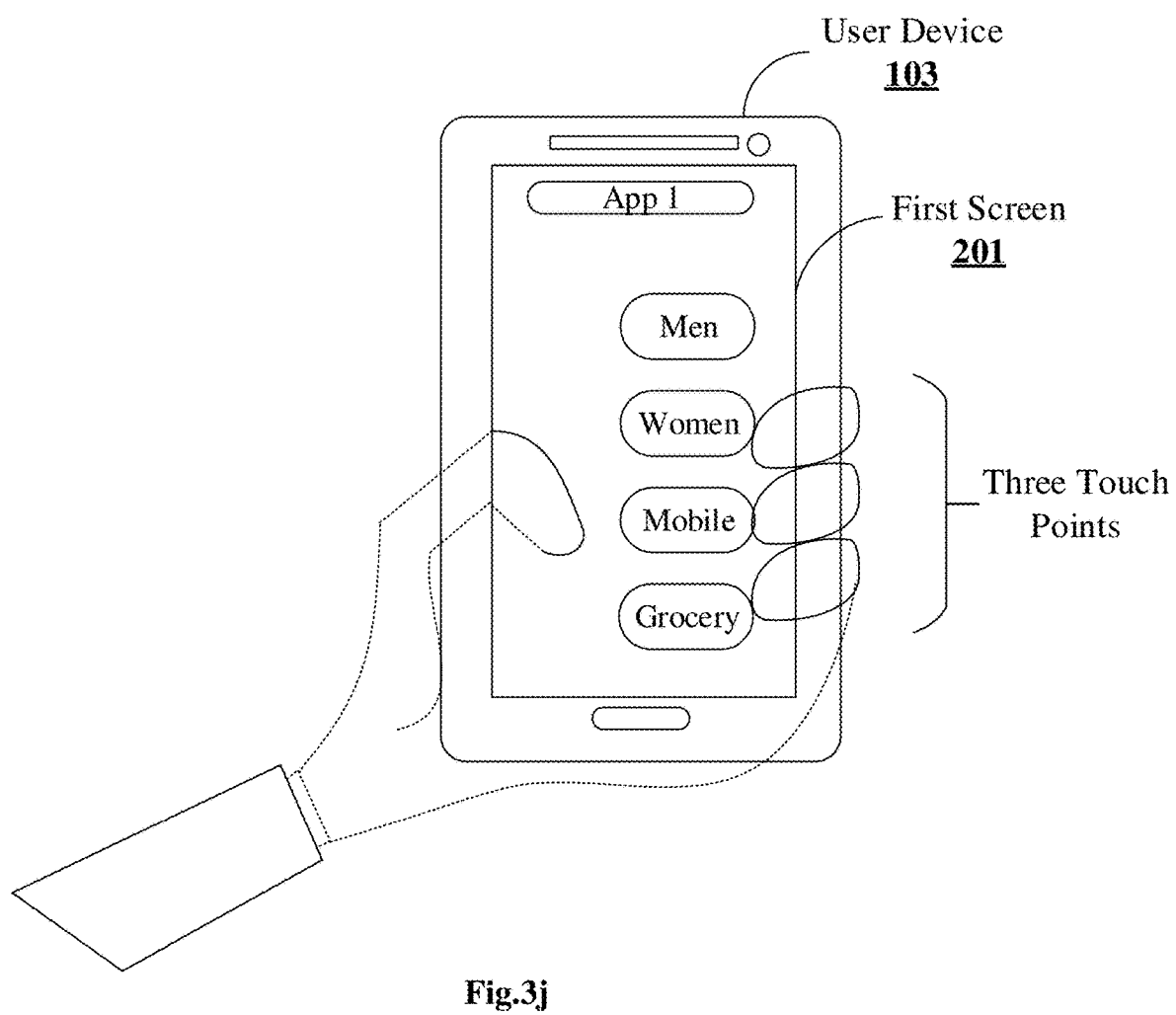

As shown in FIG. 3j, when the App1 is selected, the one or more sensors 102 may detect at least one of the operating hand of the user 101 and the number of touch points on one or more screens of the App 1. The one or more sensors 102 may detect the operating hand of the user 101 to be "left hand." The one or more menu options of the App 1 mapped to the left hand of the user 101 is displayed on the first screen 201 of the App 1. As an example, the one or more menu options which are mapped to the left hand of the user 101 are "Men," "Women," "Mobile," and "Grocery". When any user 101 is using the App 1 and operating the user device 103 using "left hand," then the one or more menu options which are mapped for the "left hand" may be displayed on the first screen 201 of the App 1 as shown in FIG. 3j. At each screen, the one or more sensors 102 detects the operating hand of the user 101 and the number of touch points on the screen of the App 1. At the first screen 201, the one or more sensors 102 may detect the number of touch points as "three." The user 101 may touch the first screen 201 using three fingers of the left hand. In this scenario, the number of touch points "three" is mapped with a third menu option in the first screen 201, which is "Mobile" and hence the menu option "Mobile" is selected by the application navigation system 105. Further, the one or more menu options corresponding to the selected menu option "Mobile" is provided on a second screen 203 which is subsequent to the first screen 201.

Figure 3K:
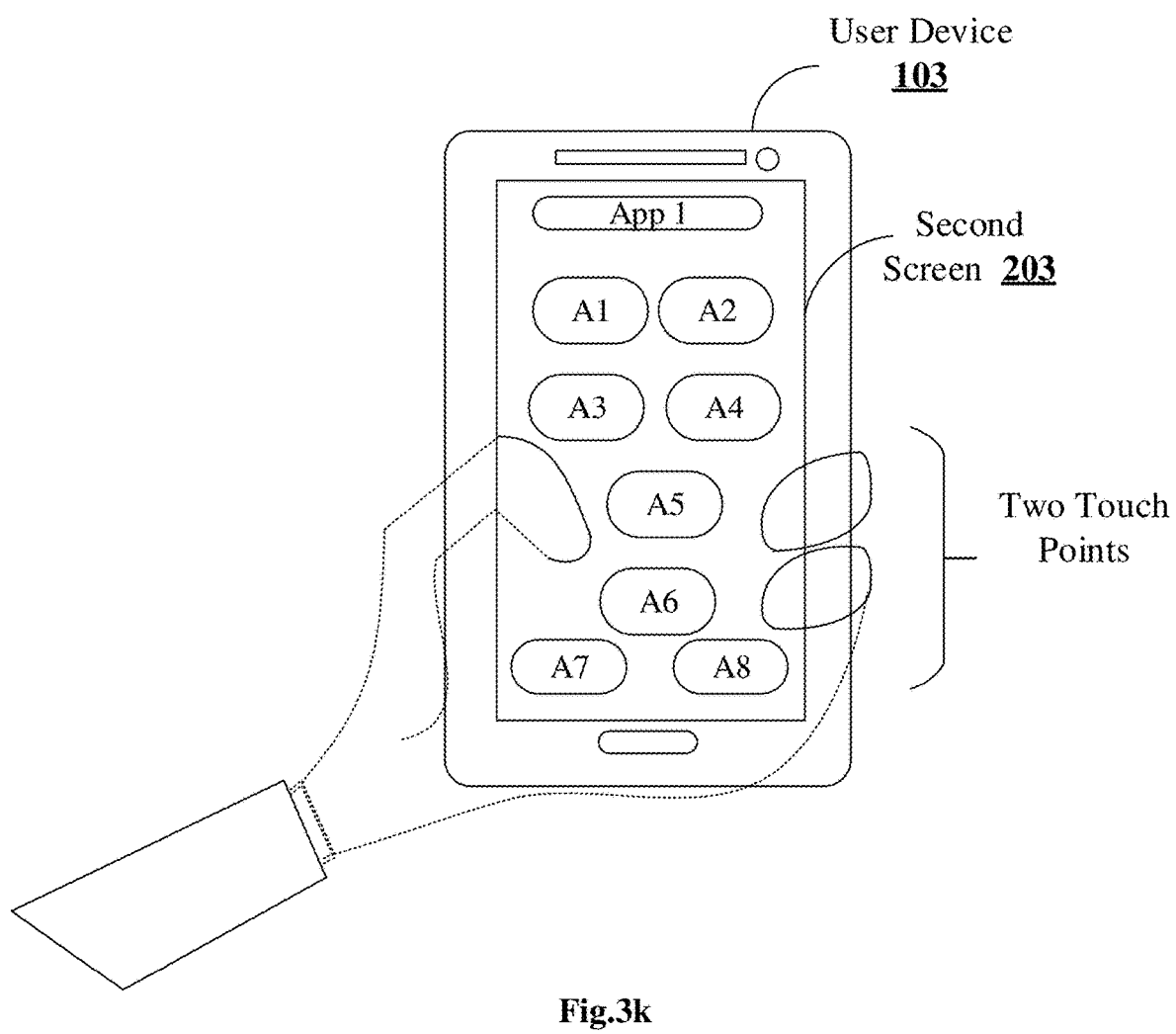

The one or more menu options corresponding to the selected menu option "Mobile" are "A1," "A2," "A3," "A4," "A5," "A6," "A7," and "A8," which are provided on the second screen 203 of the App 1, as shown in FIG. 3k. The one or more sensors 102 may detect at least one of the operating hand of the user 101 holding the user device 103 and the number of touch points on the second screen 203 of the App 1. As an example, the one or more sensors 102 may detect that the user 101 is holding the user device 103 in the left hand and may touch the second screen 203 using two fingers of the left hand. In this scenario, the number of touch points is "two." The number of touch points "two" is mapped with second menu option in the second screen 203 which is menu option "A2." The menu option "A2" is selected. The process of detection of at least one of the operating hand of the user 101 and the number of touch points and selection of the menu option based on the detection continues until one or more final menu options is selected for which there are no further one or more menu options.

Figure 3L:
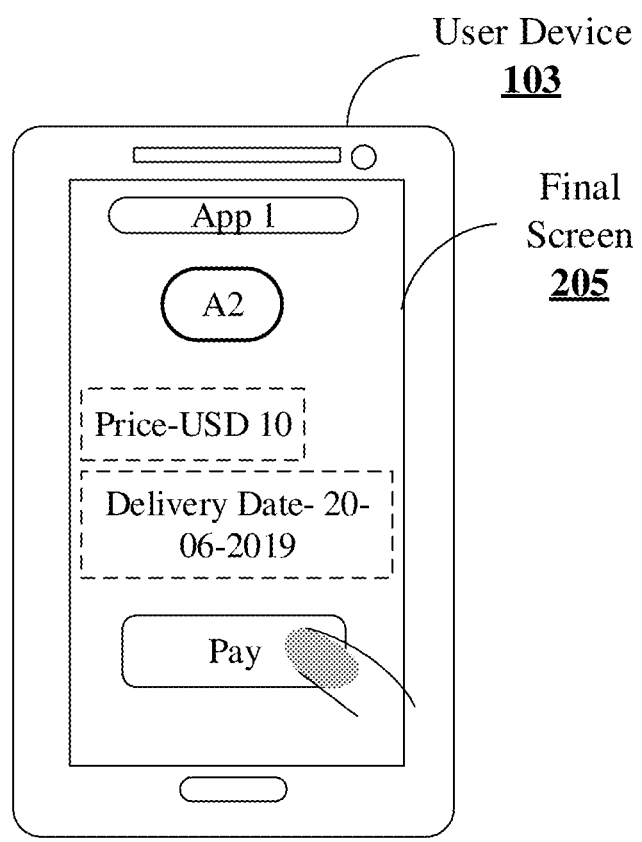

In this scenario, the menu option "A2" is the final menu option which is displayed on a final screen 205 of the App 1 as shown in FIG. 3*l*. Once the final menu option is selected by the user 101, the application navigation system 105 may initiate transaction corresponding to the selected menu option. In this scenario, since the App 1 is a shopping application, the transaction may be a financial transaction wherein the user 101 may proceed with the buying item corresponding to the final menu option A2. The details of the item corresponding to the selected menu option "A2" such as price and delivery date may be displayed on the final screen 205 of the App 1 for the user 101 to proceed with buying.

Figure 4:
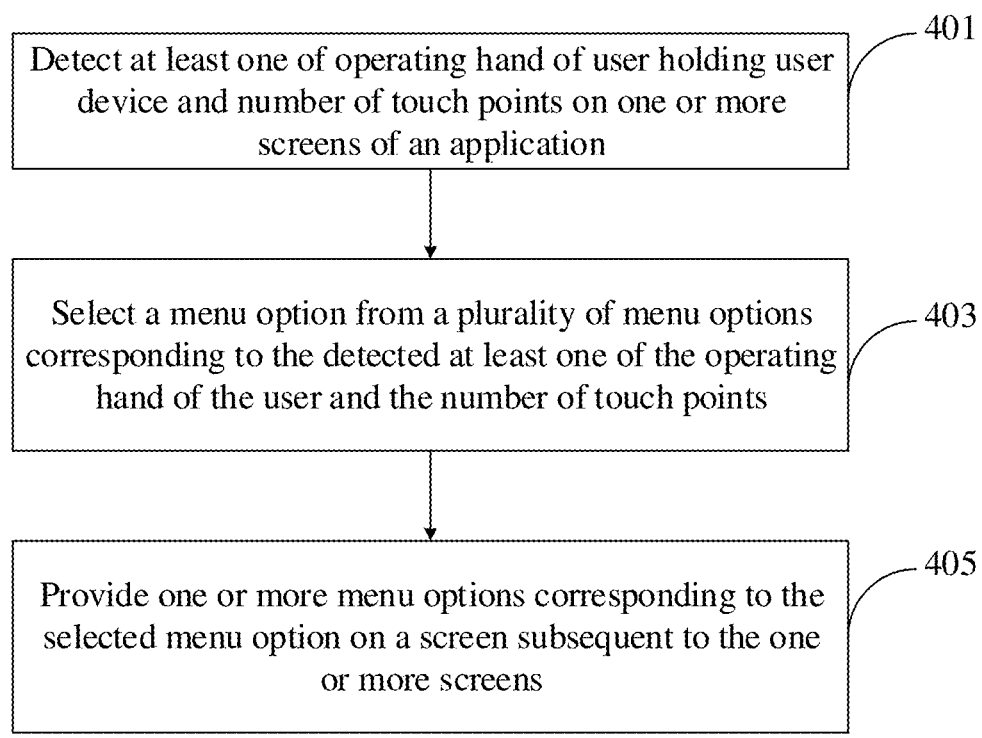
FIG. 4 shows a flowchart illustrating a method for navigating through an application in a user device in accordance with some non-limiting embodiments or aspects of the present disclosure.

FIG. 4 shows a flowchart illustrating a method of navigating an application in a user device 103 in accordance with some non-limiting embodiments or aspects of the present disclosure. As illustrated in FIG. 4, the method includes one or more blocks illustrating a method of navigating an application in a user device 103. The method may be described in the general context of computer executable instructions. Generally, computer executable instructions can include routines, programs, objects, components, data structures, procedures, modules, and functions, which perform specific functions or implement specific abstract data types.

The order in which the method is described is not intended to be construed as a limitation, and any number of the described method blocks can be combined in any order to implement the method. Additionally, individual blocks may be deleted from the method without departing from the spirit and scope of the subject matter described herein. Furthermore, the method can be implemented in any suitable hardware, software, firmware, or combination thereof.

At block 401, the method may include detecting at least one of operating hand of a user 101 holding the user device 103 and number of touch points on one or more screens of an application. The application may comprise one or more screens and a plurality of menu options on each of the one or more screens. The at least one of the operating hand of the user 101 and the number of touch points may be detected using one or more sensors 102 embedded in the user device 103. The one or more sensors 102 may capture sensor data 115 associated with the detected at least one of the operating hand and number of touch points. The at least one of the operating hand of the user 101 holding the user device 103 and number of touch points on the one or more screens of the application is mapped to the one or more menu options of the application based on a predefined user profile of each user 101 holding the user device 103.

At block 403, the method may include selecting a menu option from the plurality of menu options on the one or more screens of the application. The menu option being selected may correspond to the detected at least one of the operating hand of the user 101 and number of touch points. In some non-limiting embodiments or aspects, each selected menu option on the one or more screens is associated with one or more menu options in a screen subsequent to the one or more screens of the application.

At block 405, the method may include providing the one or more menu options associated with each selected menu option on the screen subsequent to the one or more screens of the application. As an example, when the menu option is selected from a first screen, the one or more menu options associated with the selected menu option may be provided on a second screen of the application wherein the second screen is subsequent to the first screen. In some non-limiting embodiments or aspects, the process of detecting at least one of the operating hand of the user 101 and the number of touch points continues until one or more final menu options of the application is reached. The one or more final menu options may be provided on a final screen of the application. Once the one or more final menu options is selected, a transaction is initiated corresponding to the selected one or more final menu options.

Figure 5:
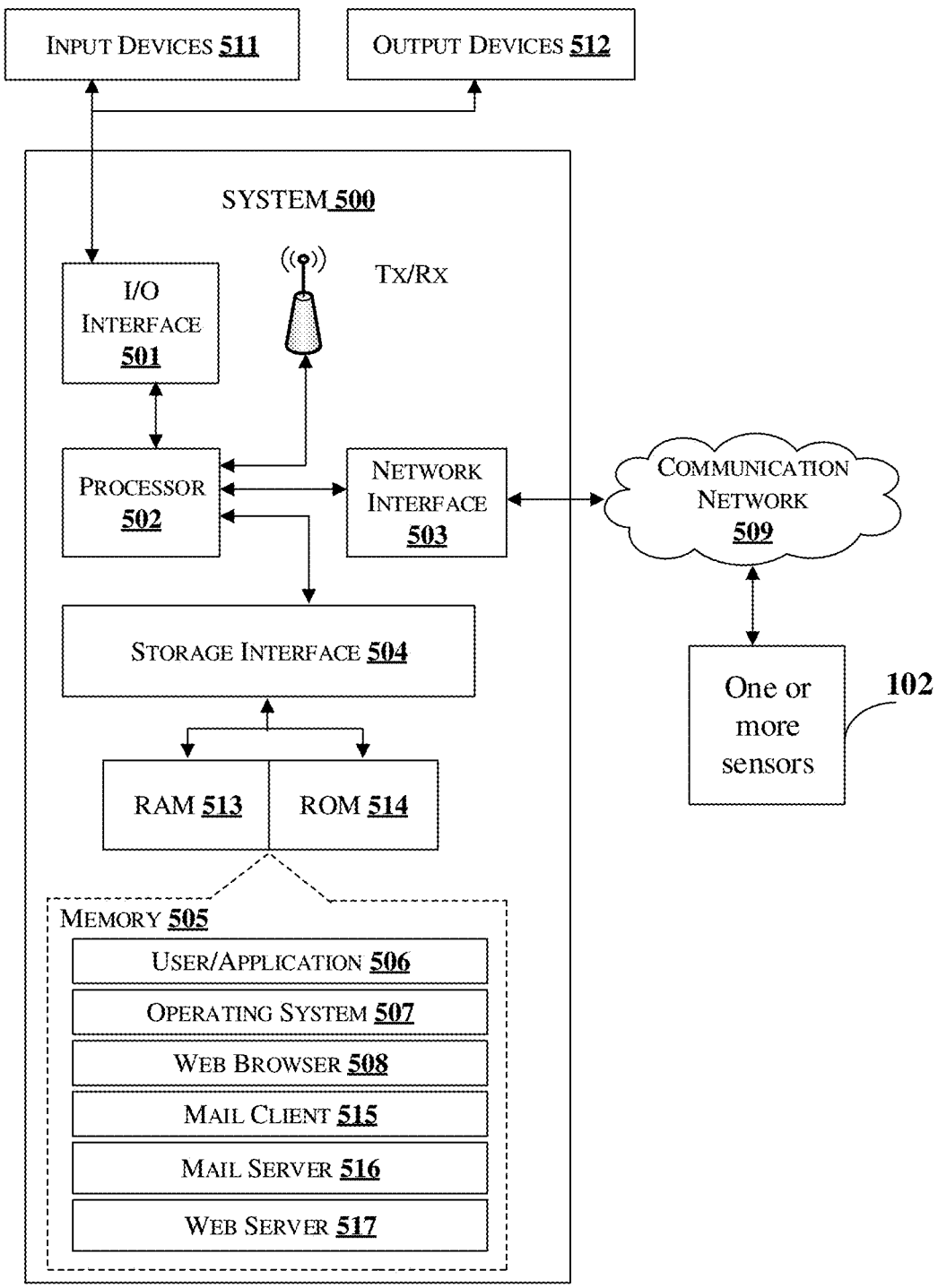
FIG. 5 illustrates a block diagram of an exemplary computer system for implementing non-limiting embodiments or aspects consistent with the present disclosure.

FIG. 5 illustrates a block diagram of an exemplary computer system 500 for implementing embodiments consistent with the present disclosure. In some non-limiting embodiments or aspects, the computer system 500 may be an application navigation system 105 for navigating an application in a user device 103. The computer system 500 may include a central processing unit ("CPU" or "processor") 502. The processor 502 may comprise at least one data processor for executing program components for executing user or system-generated business processes. The processor 502 may include specialized processing units such as integrated system (bus) controllers, memory management control units, floating point units, graphics processing units, digital signal processing units, etc.

The processor 502 may be disposed in communication with one or more input/output (I/O) devices (511 and 512) via I/O interface 501. The I/O interface 501 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth®, cellular (e.g., Code-Division Multiple Access (CDMA), High-Speed Packet Access (HSPA+), Global System For Mobile Communications (GSM), Long-Term Evolution (LTE) or the like), etc. Using the I/O interface 501, the computer system 500 may communicate with one or more I/O devices 511 and 512. In some implementations, the I/O interface 501 may be used to connect to one or more sensors 102 to receive sensor data 115.

In some non-limiting embodiments or aspects, the processor 502 may be disposed in communication with a communication network 509 via a network interface 503. The network interface 503 may communicate with the communication network 509. The network interface 503 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc.

The communication network 509 can be implemented as one of the several types of networks, such as intranet or Local Area Network (LAN) and such within the organization. The communication network 509 may either be a dedicated network or a shared network, which represents an association of several types of networks that use a variety of protocols, for e.g., Hypertext Transfer Protocol (HTTP), Transmission Control Protocol/Internet Protocol (TCP/IP), Wireless Application Protocol (WAP), etc., to communicate with each other. Further, the communication network 509 may include a variety of network devices, including routers, bridges, servers, computing devices, storage devices, etc.

In some non-limiting embodiments or aspects, the processor 502 may be disposed in communication with a memory 505 (e.g., RAM 513, ROM 514, etc. as shown in FIG. 5) via a storage interface 504. The storage interface 504 may connect to memory 505 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user/application 506, an operating system 507, a web browser 508, mail client 515, mail server 516, web server 517, and the like. In some non-limiting embodiments or aspects, computer system 500 may store user/application data 506, such as the data, variables, records, etc. as described in this disclosure. Such databases may be implemented as fault-tolerant, relational, scalable, secure databases such as Oracle® or Sybase®.

The operating system 507 may facilitate resource management and operation of the computer system 500. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT WINDOWS® (XP™, VISTA™/7/8, 10 etc.), APPLE® IOS™ GOOGLE® ANDROID™, BLACKBERRY® OS, or the like. A user interface may facilitate display, execution, interaction, manipulation, or operation of program components through textual or graphical facilities. For example, user interfaces may provide computer interaction interface elements on a display system operatively connected to the computer system 500, such as cursors, icons, check boxes, menus, windows, widgets, etc. Graphical User Interfaces (GUIs) may be employed, including, without limitation, APPLE MACINTOSH® operating systems, IBM™ OS/2, MICROSOFT WINDOWS® (XP™ VISTA™/7/8, 10 etc.), Unix® X-Windows, web interface libraries (e.g., AJAX™ DHTML™, ADOBE® FLASH™, JAVASCRIPT™, JAVA™, etc.), or the like.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.g., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

In some non-limiting embodiments or aspects, the present disclosure provides a method and system to navigate through an application in a user device.

In some non-limiting embodiments or aspects, the present disclosure provides a method which adapts to ergonomics of a user holding the user device for displaying one or more menu options, thereby making the user interaction easier and faster.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the embodiments of the present disclosure are intended to be illustrative, but not limiting, of the scope of the disclosure, which is set forth in the following claims. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A computer-implemented method, comprising:
    detecting, with one or more processors in communication with one or more sensors, an operating hand of a user holding a user device, configured with an application configured to initiate a transaction with a merchant;
    displaying or causing the display of, with one or more processors, a plurality of menu options on each of one or more screens of the application, wherein the plurality of menu options displayed comprises different sets of menu options based on the operating hand of the user being a left hand or a right hand, while the operating hand is holding the user device, wherein a first set of menu options of the different sets of menu options corresponds to card options for payment for the transaction, and wherein a second set of menu options of the different sets of menu options corresponds to wallet options for payment for the transaction;
    detecting, with one or more processors in communication with one or more sensors, a number of touch points of the operating hand holding the user device on the one or more screens of the application;
    selecting, with one or more processors, a menu option from the plurality of menu options on the one or more screens corresponding to the operating hand of the user and the number of touch points on the one or more screens while the operating hand is holding the user device, wherein each selected menu option on the one or more screens is associated with one or more menu options in a screen subsequent to the one or more screens; and
    displaying or causing the display of, with one or more processors, the one or more menu options associated with each selected menu option on the screen subsequent to the one or more screens.

2. The method of claim 1, further comprising initiating, with one or more processors, a transaction based on a selection of a final menu option among the one or more menu options displayed on a final screen of the one or more screens of the application, by transmitting payment credentials associated with the final menu option to a merchant.

3. The method of claim 1, wherein the one or more sensors are embedded in the user device and comprise at least one of the following: a gyroscope, a pressure sensor, a touch sensor, an accelerometer, or any combination thereof.

4. The method of claim 1, wherein the number of touch points is detected based on sensor data comprising information about one or more fingers of the operating hand of the user holding the user device.

5. The method of claim 1, wherein the at least one of the operating hand of the user holding the user device and the number of touch points on the one or more screens of the application is mapped, with one or more processors, to the one or more menu options of the application based on a predefined user profile of each user holding the user device.

6. An application navigation system, comprising:
one or more processors in communication with one or more sensors; and
one or more computer-readable media communicatively coupled to the one or more processors and storing instructions, which upon execution, causes the one or more processors to:
detect an operating hand of a user holding a user device, configured with an application configured to initiate a transaction with a merchant;
display or cause the display of a plurality of menu options on each of one or more screens of the application, wherein the plurality of menu options displayed comprises different sets of menu options based on the operating hand of the user being a left hand or a right hand, while the operating hand is holding the user device, wherein a first set of menu options of the different sets of menu options corresponds to card options for payment for the transaction, and wherein a second set of menu options of the different sets of menu options corresponds to wallet options for payment for the transaction;
detect a number of touch points of the operating hand holding the user device on the one or more screens of the application;
select a menu option from the plurality of menu options on the one or more screens corresponding to the operating hand of the user and the number of touch points on the one or more screens while the operating hand is holding the user device, wherein each selected menu option on the one or more screens is associated with one or more menu options in a screen subsequent to the one or more screens; and
display or cause the display of the one or more menu options associated with each selected menu option on the screen subsequent to the one or more screens.

7. The application navigation system of claim 6, wherein the one or more processors initiate a transaction based on selection of a final menu option among the one or more menu options on a final screen of the one or more screens of the application, by transmitting payment credentials associated with the final menu option to a merchant.

8. The application navigation system of claim 6, wherein the one or more sensors are embedded in the user device and comprise at least one of the following: a gyroscope, a pressure sensor, a touch sensor, an accelerometer, or any combination thereof.

9. The application navigation system of claim 6, wherein the one or more processors detect the number of touch points based on sensor data comprising information about one or more fingers of the operating hand of the user holding the user device.

10. The application navigation system of claim 6, wherein the one or more processors map at least one of the operating hand of the user holding the user device and the number of touch points on the one or more screens of the application to the one or more menu options of the application based on a predefined user profile of each user holding the user device.

11. A user device, comprising:
a display screen;
one or more processors in communication with one or more sensors; and
one or more computer-readable media communicatively coupled to the one or more processors and storing instructions, which upon execution, causes the one or more processors to:
detect an operating hand of a user holding the user device, configured with an application configured to initiate a transaction with a merchant;
display or cause the display of, on the display screen, a plurality of menu options on each of one or more screens of the application, wherein the plurality of menu options displayed comprises different sets of menu options based on the operating hand of the user being a left hand or a right hand, while the operating hand is holding the user device, wherein a first set of menu options of the different sets of menu options corresponds to card options for payment for the transaction, and wherein a second set of menu options of the different sets of menu options corresponds to wallet options for payment for the transaction;
detect a number of touch points of the operating hand holding the user device on the one or more screens of the application;
select a menu option from the plurality of menu options on the one or more screens corresponding to the operating hand of the user and the number of touch points on the one or more screens while the operating hand is holding the user device, wherein each selected menu option on the one or more screens is associated with one or more menu options in a screen subsequent to the one or more screens; and
display or cause the display of, on the display screen, the one or more menu options associated with each selected menu option on the screen subsequent to the one or more screens.

12. The user device of claim 11, wherein the one or more sensors are embedded in the user device and comprise at least one of the following: a gyroscope, a pressure sensor, a touch sensor, an accelerometer, or any combination thereof.

13. The user device of claim 11, wherein the one or more processors initiate a transaction based on selection of a final menu option among the one or more menu options on a final screen of the one or more screens of the application, by transmitting payment credentials associated with the final menu option to a merchant.

14. The user device of claim 11, wherein the one or more processors detect the number of touch points based on sensor data comprising information about one or more fingers of the operating hand of the user holding the user device.

15. The user device of claim 11, wherein the one or more processors map at least one of the operating hand of the user holding the user device and the number of touch points on the one or more screens of the application to the one or more menu options of the application based on a predefined user profile of each user holding the user device.

* * * * *